(12) United States Patent
Grimm et al.

(10) Patent No.: US 10,800,318 B2
(45) Date of Patent: Oct. 13, 2020

(54) ADJUSTER EXTENDER MECHANISM

(71) Applicant: Asyst Technologies, LLC, Kenosha, WI (US)

(72) Inventors: Michael B. Grimm, Antioch, IL (US); Scott T. Fladhammer, Caledonia, WI (US)

(73) Assignee: Asyst Technologies, LLC, Kenosha, WI (US)

( * ) Notice: Subject to any disclaimer, the term of this patent is extended or adjusted under 35 U.S.C. 154(b) by 237 days.

(21) Appl. No.: 16/111,295

(22) Filed: Aug. 24, 2018

(65) Prior Publication Data

US 2019/0061603 A1 Feb. 28, 2019

Related U.S. Application Data

(60) Provisional application No. 62/551,673, filed on Aug. 29, 2017.

(51) Int. Cl.
| | |
|---|---|
| *B60Q 1/06* | (2006.01) |
| *B60Q 1/068* | (2006.01) |
| *F16H 25/20* | (2006.01) |
| *B60Q 1/076* | (2006.01) |

(52) U.S. Cl.
CPC .......... *B60Q 1/0683* (2013.01); *B60Q 1/076* (2013.01); *F16H 25/2015* (2013.01); *B60Q 2200/32* (2013.01); *B60Q 2900/10* (2013.01); *F16H 2025/2093* (2013.01)

(58) Field of Classification Search
CPC .. B60Q 1/0683; B60Q 1/076; B60Q 2200/36; B60Q 2200/32; B60Q 2900/10; F16H 25/2015; F16H 2025/2098; F16B 7/042; F16B 7/22
See application file for complete search history.

(56) References Cited

U.S. PATENT DOCUMENTS

| | | |
|---|---|---|
| 5,214,971 A | 6/1993 | Burton et al. |
| 5,707,133 A | 1/1998 | Burton |
| 6,257,747 B1 | 7/2001 | Burton |
| 2005/0190571 A1 | 9/2005 | Watson |

FOREIGN PATENT DOCUMENTS

| | | |
|---|---|---|
| CN | 104986098 | 10/2015 |
| DE | 102008006452 | 7/2009 |
| DE | 102009033910 | 1/2011 |
| EP | 2112021 | 4/2008 |
| EP | 2719579 | 4/2014 |
| EP | 2803528 | 11/2014 |

OTHER PUBLICATIONS

European Search Report dated Jan. 21, 2019 for pending European Patent Application No. 18191170.2.

*Primary Examiner* — David H Bollinger
(74) *Attorney, Agent, or Firm* — James Joyce; Godfrey & Kahn, S.C.

(57) ABSTRACT

An adjuster extender is provided that includes a tubular sleeve longitudinally connected to an extender stud, the sleeve having an inner bore for matingly receiving an adjustment shaft of an adjuster to provide radial support therebetween, and a plurality of engagement arms that extend from the sleeve into the inner bore, the engagement arms including arm ends for engaging an adjuster stud on the adjustment shaft to provide an axial interlock between the sleeve and the adjustment shaft.

20 Claims, 25 Drawing Sheets

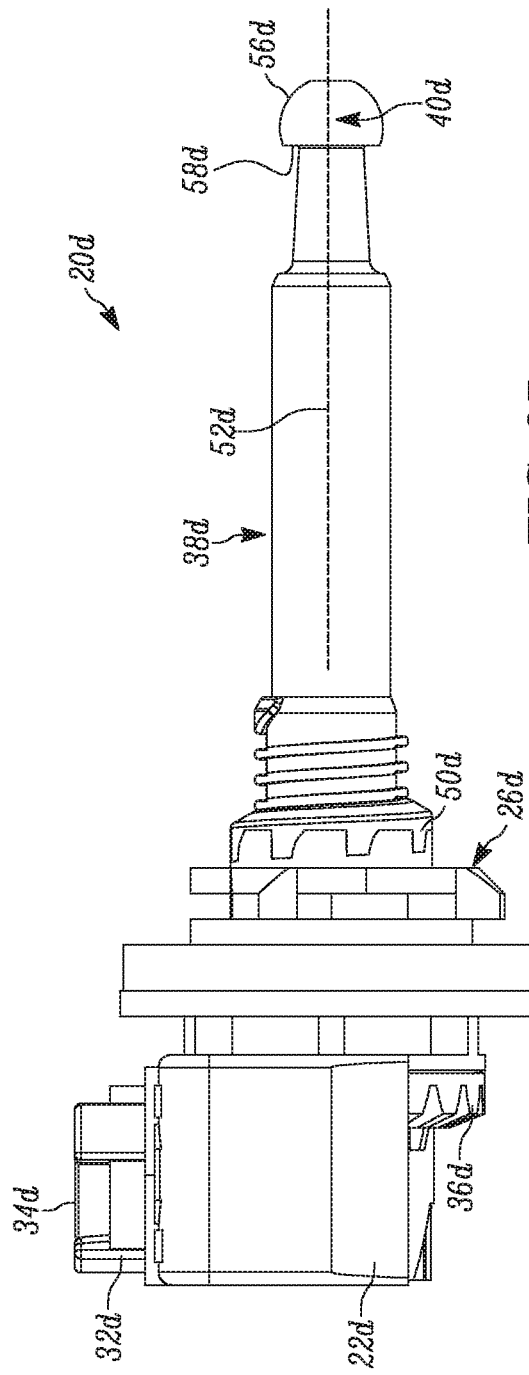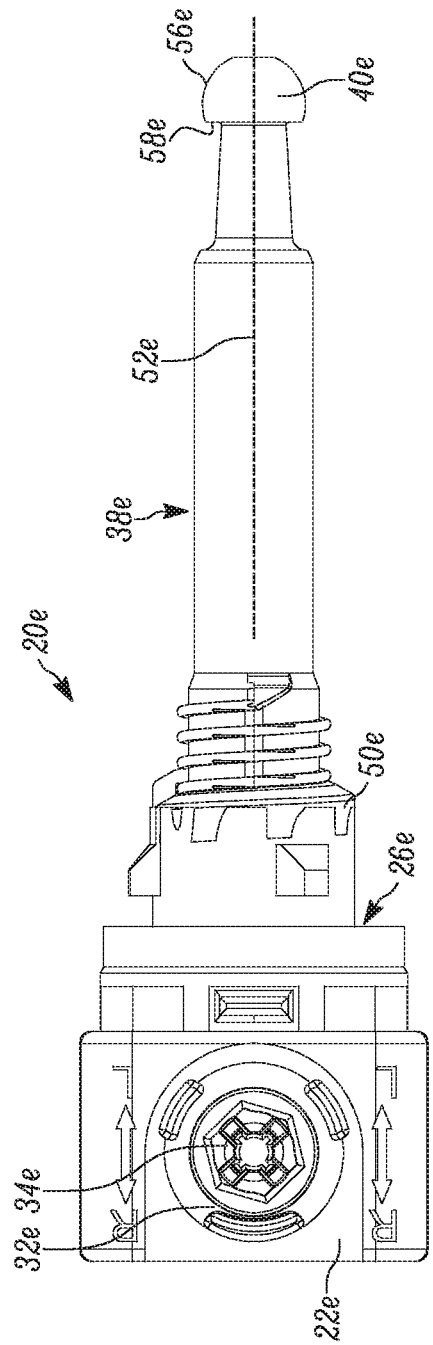

ADJUSTER EXTENDER MECHANISM

CROSS-REFERENCE

This application claims priority to and incorporates by reference herein U.S. Provisional Patent Application Ser. No. 62/551,673 filed on Aug. 29, 2017.

FIELD OF THE INVENTION

This invention relates generally to adjuster mechanisms and in particular to a headlamp adjuster extender mechanism for use in motor vehicles.

BACKGROUND

As the design of vehicles, automobiles and small trucks in particular, has evolved, headlights have continually been reconfigured to improve the aerodynamics of the front end of the vehicle. Modern headlights are designed so that their lenses follow the contour of the vehicle to provide an aerodynamically efficient exterior surface. However, adjustment of these headlights must still be performed in order to provide an optimal beam of light and to prevent the aiming of light beams toward oncoming vehicles. Automotive manufacturers' demand for aerodynamically efficient headlight designs has led to modular designs requiring the headlight adjustment mechanism to be located within the interior of the engine compartment so that adjustment can be easily performed without removing any trim pieces. Thus, the constraints of the installation area and the demands of the automobile manufacturers for aerodynamic headlight designs dictate that an adjuster for use with the aerodynamic designs be adjustable from inside the engine compartment and be able to translate rotational motion of the adjusting part into linear motion of the adjusting means that adjusts the lamp within the headlight assembly. There are many devices incorporating such designs including, among others, the devices disclosed in U.S. Pat. Nos. 5,707,133; 5,214,971; and 6,257,747 to Burton, the disclosures of which are incorporated herein by reference.

Automotive lamp assemblies used as headlights typically include several basic parts: a support frame, a reflector, a lens, a bulb, and one or more adjusters. The support frame either completely houses the reflector and the bulb on a pivotable mounting to allow the aim of the light to be adjusted using the adjusters or provides a mounting surface for attaching a headlamp adjuster. The lens seals the front of either the support frame or directly to the reflector to protect it from the elements assailing the front end of the vehicle and provides an aerodynamic shape and attractive appearance. The reflector mounts on one fixed ball joint and is adjustable horizontally and vertically using adjusters that interface with the reflector through moving ball joints. The moving ball joints are moveable by actuating the adjusters connected to the moving ball joints by a ball stud having a head and a shaft. Right angle style adjusters, such as the ones disclosed in some of the referenced Burton patents, are often used to allow the adjustment of the headlight from an adjusting position above the installed headlight. In other applications, motorized adjusters, straight adjusters, or other types of adjuster are used.

As automotive lamp assemblies gain complexity in both shape and placement on a vehicle, current adjusters can be limited in their application due to manufacturing constraints, among other things, that might otherwise allow for extended length adjusters suitable to satisfy the requirements for use in a vehicle, as generally noted above.

SUMMARY OF THE INVENTION

As illustrated by the following description and shown in the FIGS., the present invention overcomes the limitations and disadvantages of existing adjuster assemblies, at least by utilizing an effective design wherein an adjuster can be extended in a manner that provides sufficient structural integrity to endure the typical forces that automotive lamp assemblies endure, while also providing the capability to utilize multiple length extensions on a single adjuster, as well as multiple securement configurations.

In at least some embodiments, an adjuster extender is provided that includes: a tubular sleeve longitudinally connected to an extender stud, the sleeve having an inner bore for matingly receiving an adjustment shaft of an adjuster to provide radial support therebetween; and a plurality of engagement arms that extend from the sleeve into the inner bore, the engagement arms including arm ends for engaging an adjuster stud on the adjustment shaft to provide an axial interlock between the sleeve and the adjustment shaft.

In at least some other embodiments, an adjuster extender mechanism is provided that includes: an adjuster comprising: a housing having a neck; a drive gear rotatably engaged with an adjustment shaft extending from the neck, the adjustment shaft including an engagement portion and an adjuster stud at a front end; and an adjuster extender comprising: a tubular sleeve longitudinally connected to an extender stud, the sleeve including an inner bore for matingly receiving therein the engagement portion of the adjustment shaft of the adjuster to provide radial support therebetween; and a plurality of engagement arms that extend from the sleeve into the inner bore, the engagement arms including arm ends for engaging a rear wall portion of the adjuster stud after insertion into the inner bore to axially secure the adjuster extender to the adjustment shaft.

In at least some further embodiments, an adjuster extender mechanism is provided that includes an adjuster comprising: a housing having a neck; a drive gear rotatably engaged with an adjustment shaft extending from the neck, the adjustment shaft including an engagement portion and an adjuster stud at a front end; and a plurality of arms extending outward from the adjustment shaft; and an adjuster extender comprising: a tubular sleeve longitudinally connected to an extender stud, the sleeve including an inner bore for matingly receiving therein the engagement portion of the adjustment shaft of the adjuster to provide radial support therebetween; and a plurality of arm apertures in the sleeve for receiving the arms at least partially therein to axially couple the adjuster extender to the adjuster.

BRIEF DESCRIPTION OF THE DRAWINGS

Embodiments of the adjuster extender mechanism are disclosed with reference to the accompanying drawings and are for illustrative purposes only. The invention is not limited in its application to the details of construction or the arrangement of the components illustrated in the drawings. The invention is capable of other embodiments or of being practiced or carried out in other various ways. In the drawings:

FIG. 37 is a side view of an adjuster of FIG. 36A;

FIG. 39 is a top view of an adjuster of FIG. 38A.

DETAILED DESCRIPTION

Figure 1A:
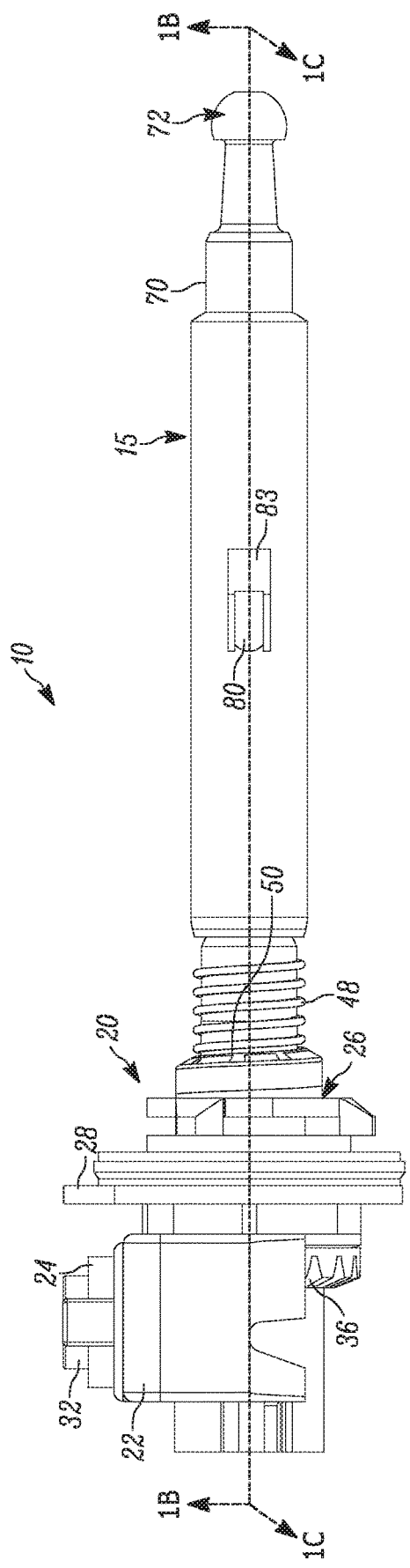
FIG. 1A is a perspective side view of an exemplary embodiment of an adjuster extender mechanism.
Figure 1B:
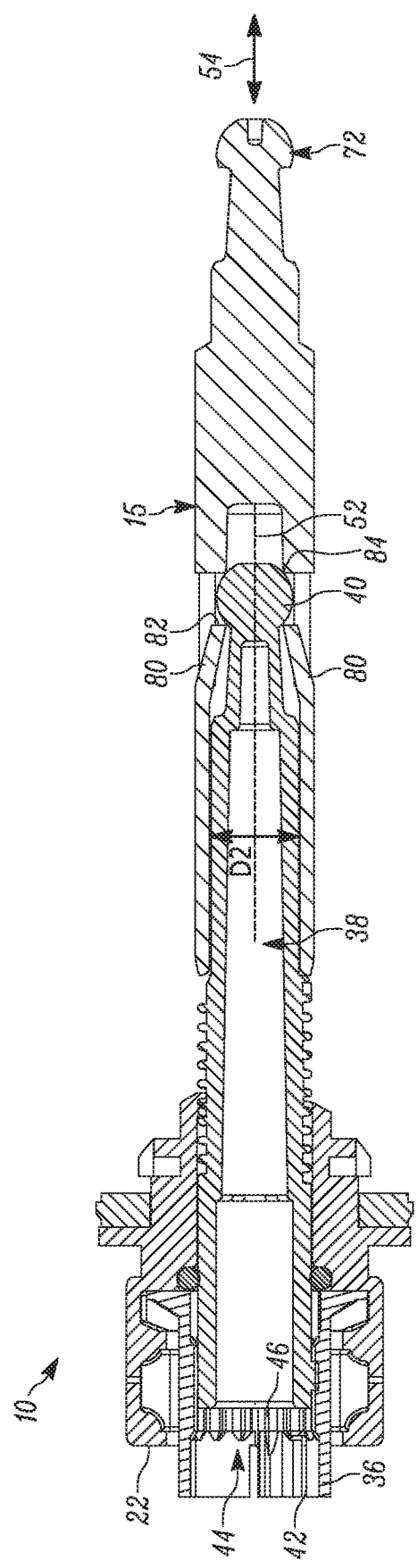
FIG. 1B is a sectional bottom view of the adjuster extender mechanism taken along lines 1B-1B of FIG. 1A.
Figure 1C:
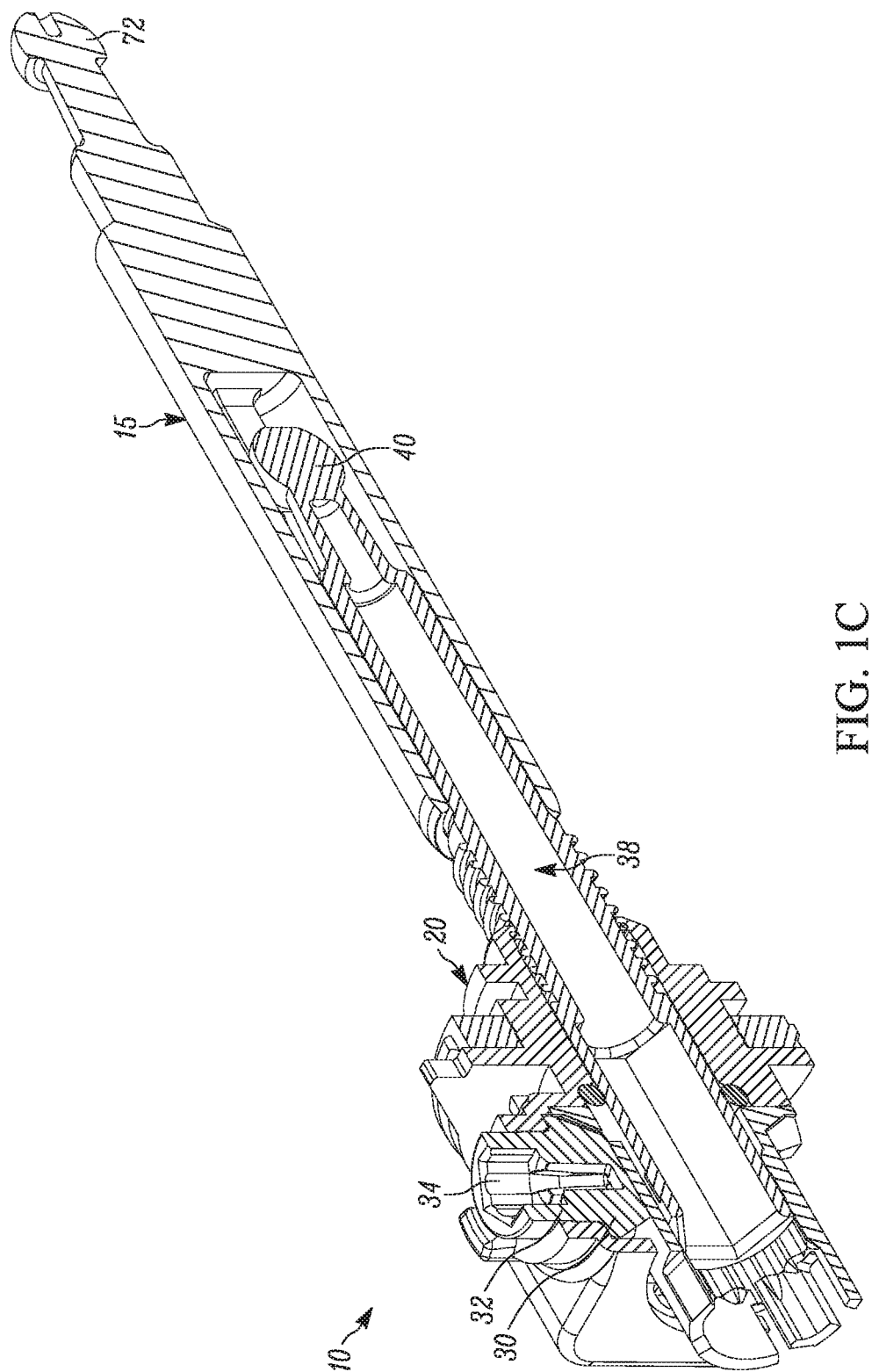
FIG. 1C is a perspective sectional side view of the adjuster extender mechanism taken along lines 1C-1C of FIG. 1A.
Figure 2:
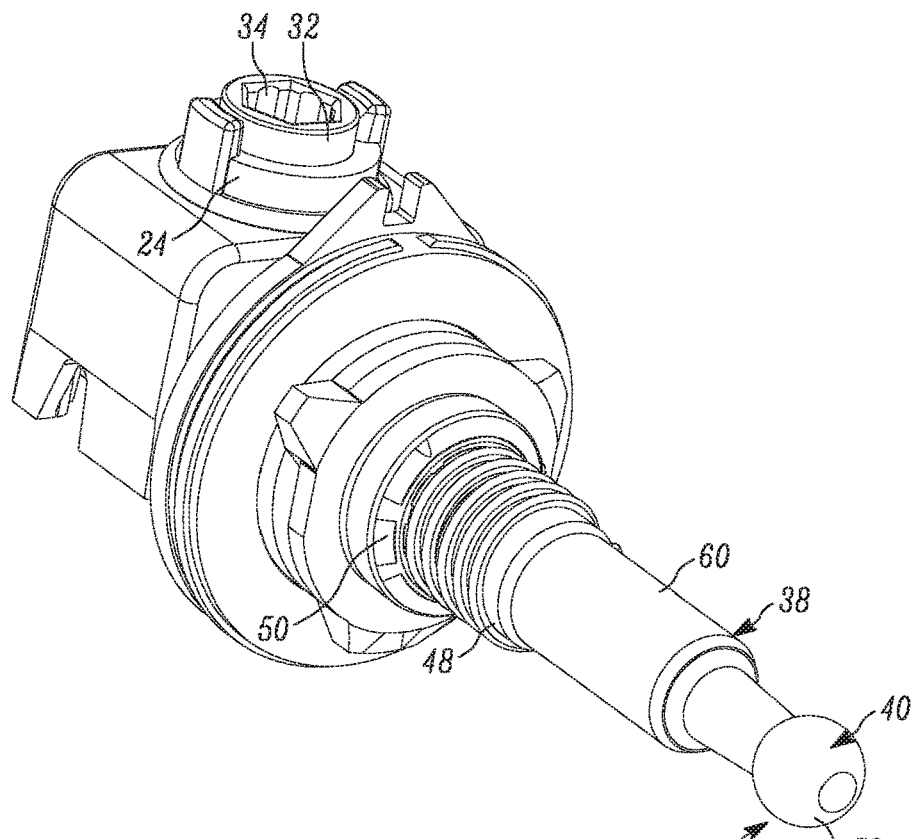
FIG. 2 is a top perspective view of an adjuster of FIG. 1A.

Referring to FIGS. 1A-1C, an embodiment of an adjuster extender mechanism 10 is shown in accordance with one exemplary embodiment of the invention. The adjuster extender mechanism 10 includes an adjuster extender 15 and an adjuster 20, as further illustrated in FIGS. 2-7B. The adjuster 20 includes a gear housing 22 having a neck 24, a housing nose 26 and a flange 28. A drive gear 30 with an integral input shaft 32 resides at least partially inside the gear housing 22. The input shaft 32 can be rotated using a standard tool by a person adjusting the aim of a reflector/headlight attached to the adjuster extender mechanism 10. The input shaft 32 includes a tool engagement portion 34, which can have any number of conventional drive tool configurations such as hexagonal, Torx®, etc. The engagement portion 34 can include a recess in the input shaft 32 or be formed as part of a head atop the input shaft 32 that can include the tool engagement portion. An adjustment gear 36 is engaged with an adjustment shaft 38 having a terminal adjuster stud 40 on a front end 41 (FIG. 2). The drive gear 30 is intermeshed with the adjustment gear 36, which thus rotates a splined gear portion 42 in a bore 44 of the adjustment gear 36, which engages shaft splines 46 that extend circumferentially around the adjustment shaft 38 to rotate the adjustment shaft 38. Rotation of the adjustment shaft 38 causes helical movement of threads 48 on the adjustment shaft 38 with respect to one or more helical thread segments 50 situated circumferentially around the housing nose 26, which results in the adjustment shaft 38 traversing axially through the gear housing 22, with the adjustment shaft 38 moving along its longitudinal axis 52 in either a forward or rearward direction as indicated by arrow 54. This movement of the adjustment shaft 38 causes a resultant displacement and adjustment of a reflector or headlamp/assembly connected to the adjuster extender 15, which is coupled to the adjustment shaft 38. Although various details of the adjuster 20 have been provided herein, it shall be understood that numerous configurations of adjusters both known in the art and unknown can be utilized with the adjuster extender 15 without departing from the teaching and principles of the invention. For example, the adjusters disclosed in the aforementioned patents to Burton (incorporated herein by reference in their entirety) as well as various other configurations can be utilized as disclosed or with minor modifications to the adjuster or the adjuster extender 15. In addition, the operation of the aforementioned exemplary adjuster configuration is applicable throughout the various embodiments described herein with the exception that the adjustment shaft 38 can be modified in various ways to accommodate the various embodiments of the adjuster extenders 15.

Figure 3:
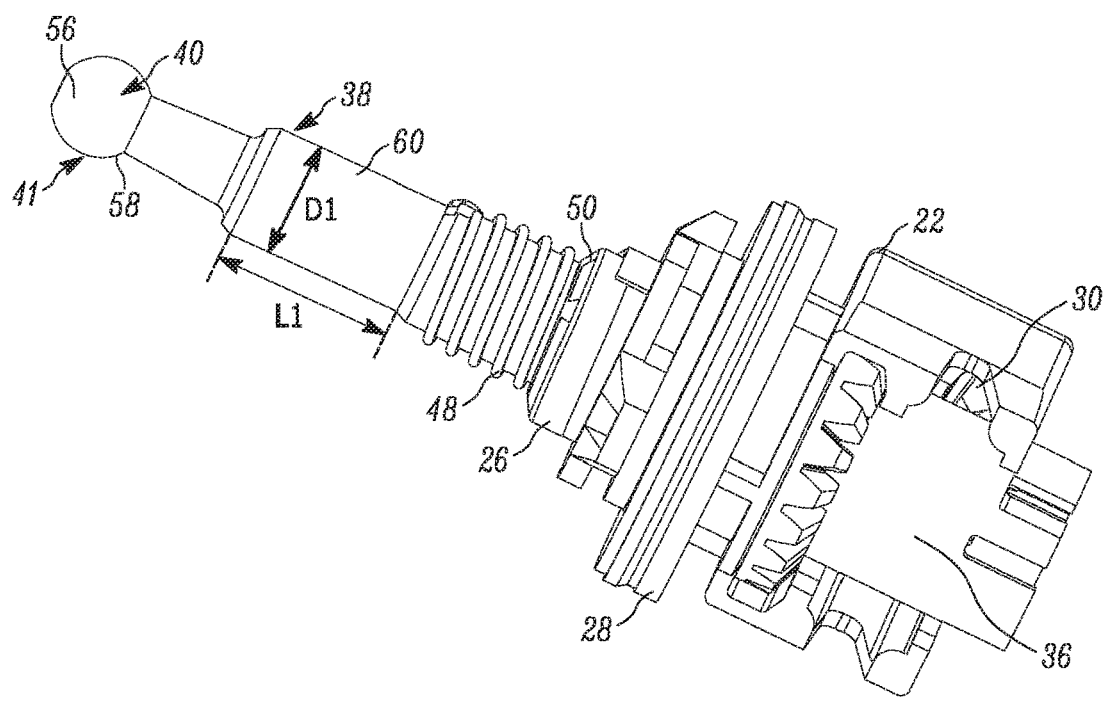
FIG. 3 is a bottom perspective view of the adjuster of FIG. 1A.
Figure 4:
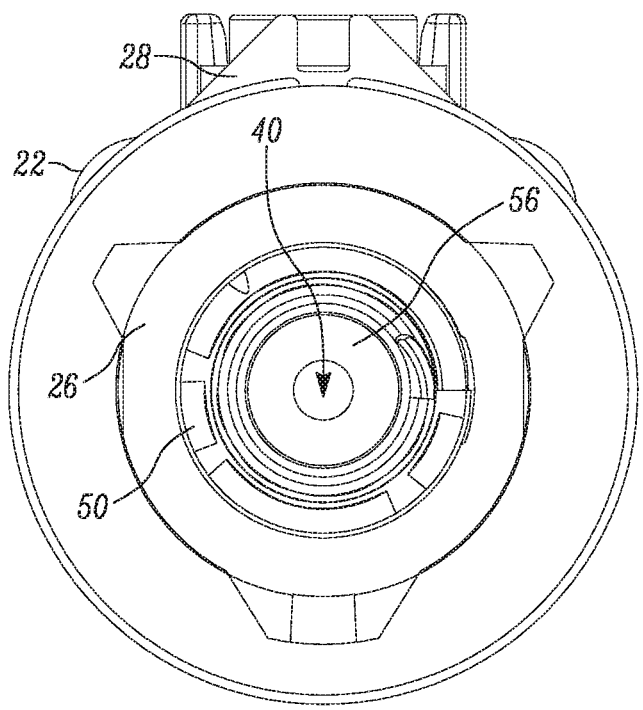
FIG. 4 is a front view of the adjuster of FIG. 1A.
Figure 5:
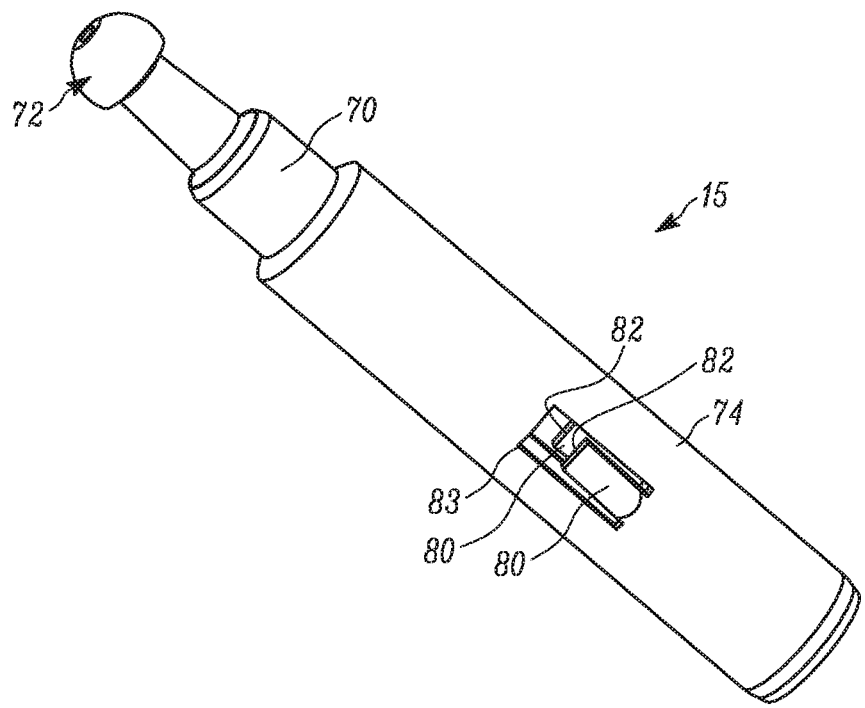
FIG. 5 is a side perspective view of the adjuster extender of FIG. 1A.
Figure 6:
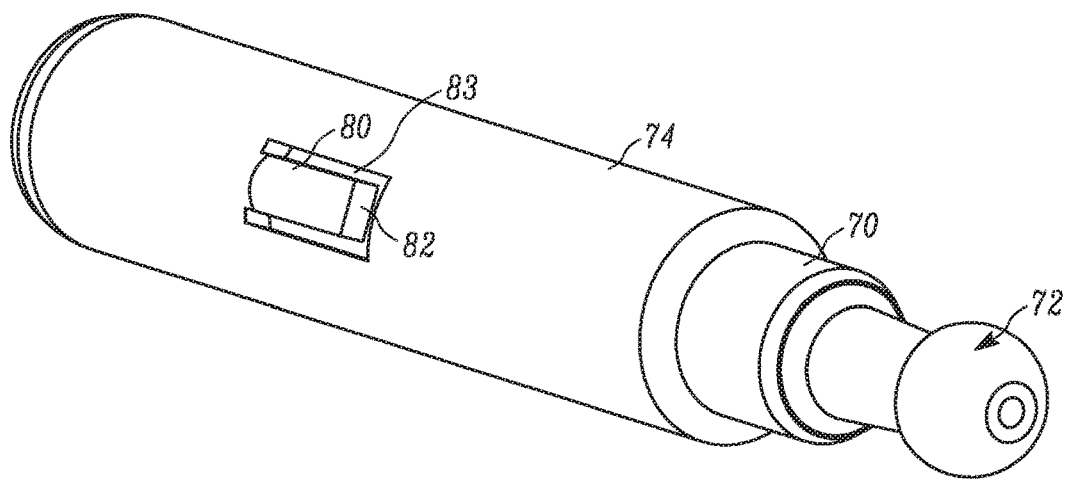
FIG. 6 is a front perspective view of the adjuster extender of FIG. 1A.
Figure 7A:
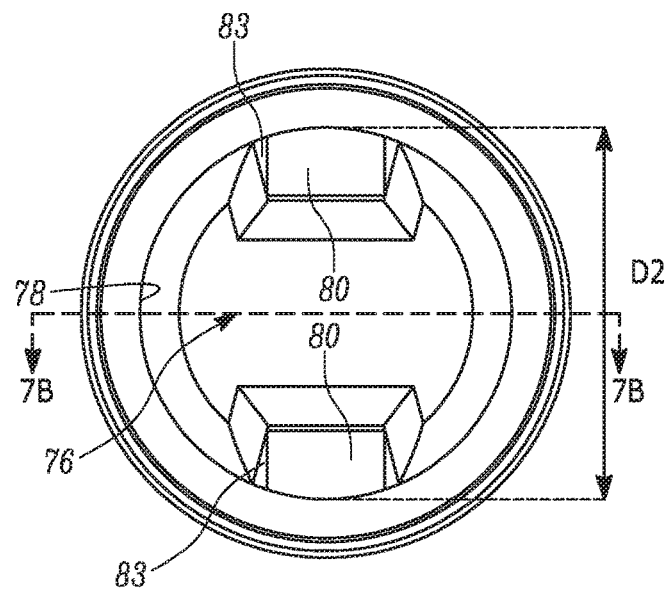
FIG. 7A is a rear view of the adjuster extender of FIG. 1A.
Figure 7B:
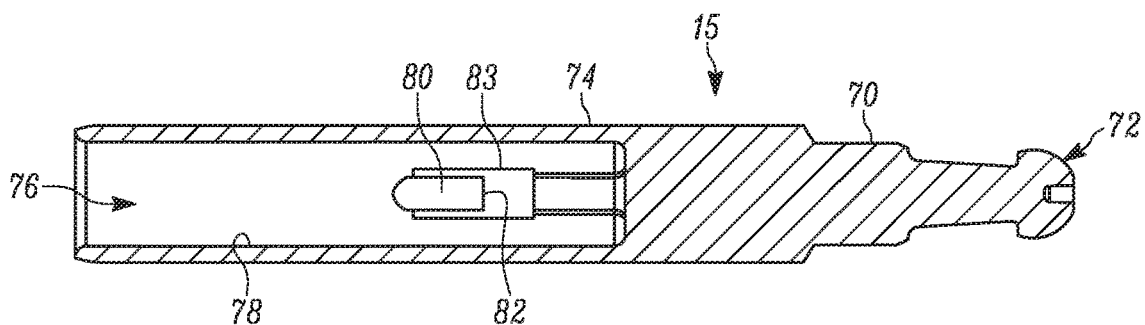
FIG. 7B is a side sectional view of the adjuster extender of FIG. 1A taken along lines 7B-7B of FIG. 7A.
Figure 8A:
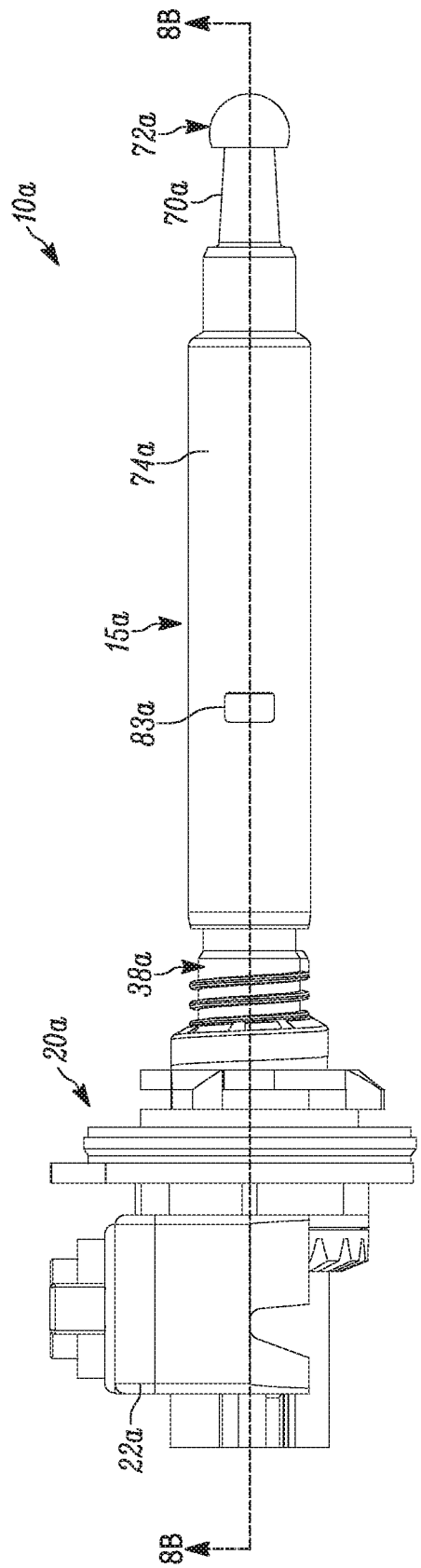
FIG. 8A is a side view of another exemplary embodiment of an adjuster extender mechanism.
Figure 8B:
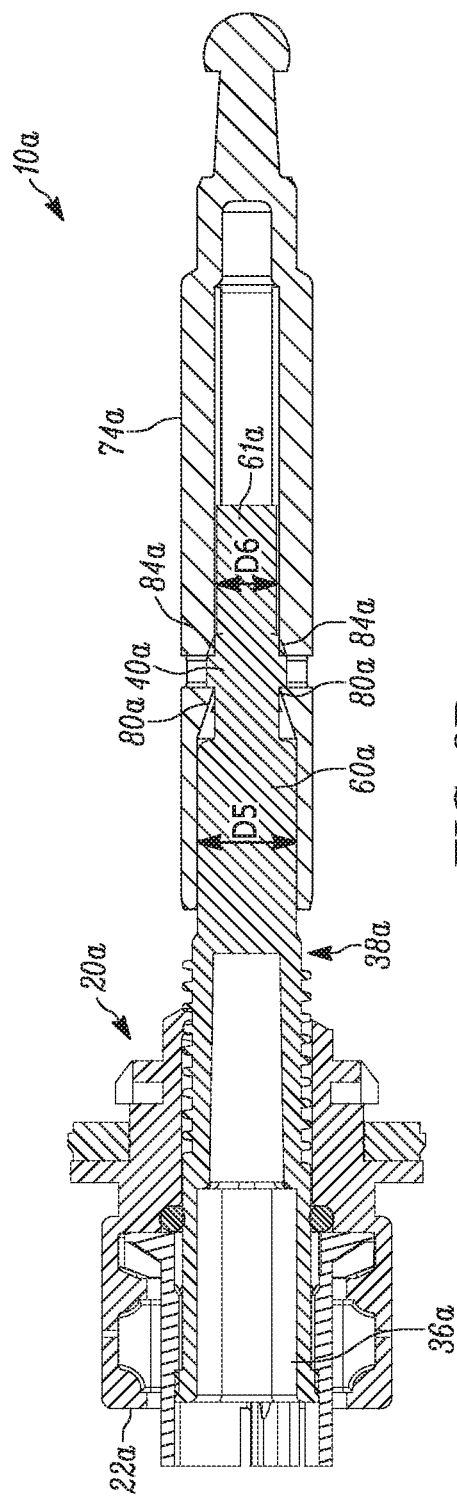
FIG. 8B is a side sectional view of the adjuster extender mechanism taken along lines 8B-8B of FIG. 8A.
Figure 9:
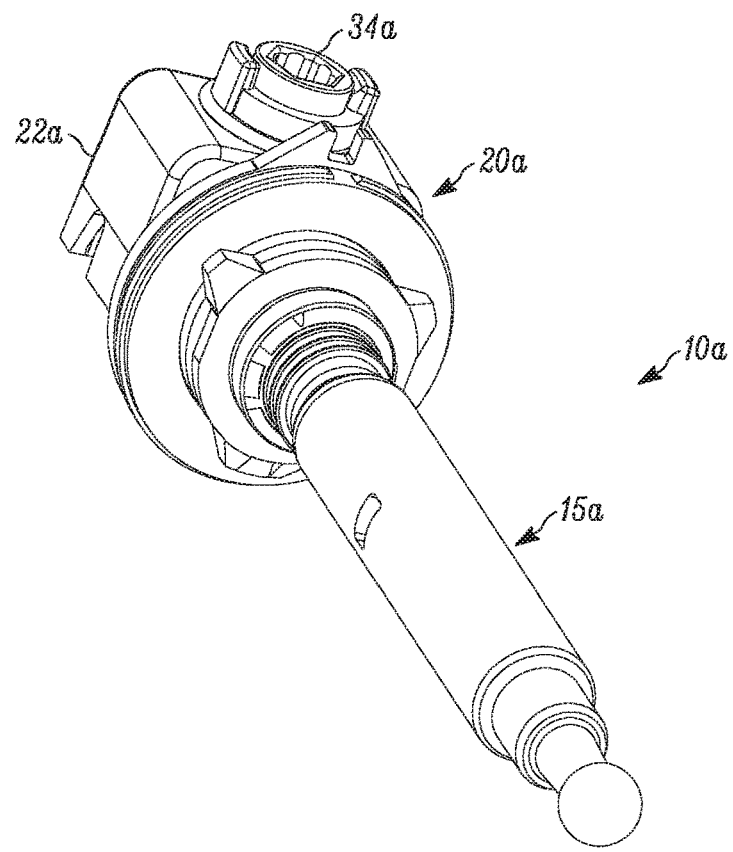
FIG. 9 is a front perspective view of the adjuster extender mechanism of FIG. 8A.
Figure 10:
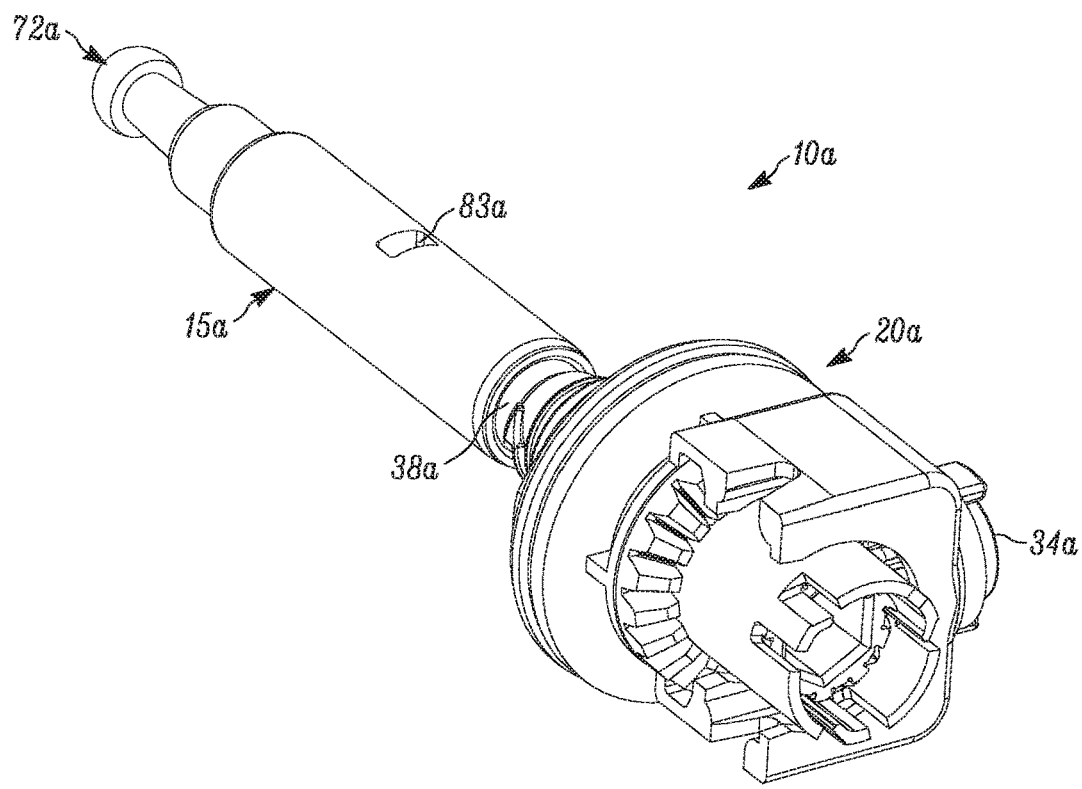
FIG. 10 is a bottom perspective view of the adjuster extender mechanism of FIG. 8A.

Referring to FIGS. 2-4, the adjuster 20 is shown with an adjustment shaft 38 that includes the adjuster stud 40 at the front end 41, wherein the adjuster stud 40 includes a front wall portion 56 situated on the front of the adjuster stud 40 and a rear wall portion 58 situated on the back of the adjuster stud 40. In at least some embodiments, including the embodiment illustrated in FIGS. 2-4, the adjuster stud 40 is generally ball-shaped. The wall portions 56 and 58 can include various configurations relative to the longitudinal axis 52 (FIG. 1B) of the adjustment shaft 38, for example, the wall portions 56 and 58 can extend perpendicular to the longitudinal axis 52, or be sloped to either side of perpendicular and can in at least some embodiments, be linear, beveled, stepped, or grooved. In at least some embodiments, the front wall portion 56 can include a rearward slope or be curved to assist with installation of the adjuster extender 15, while the rear wall portion 58 can be perpendicular to the longitudinal axis 52 or otherwise configured. The adjustment shaft 38 can include various diameters along its length, noting that in at least some embodiments, the shaft diameter is reduced in size (e.g., tapered) as the adjustment shaft 38 extends forward toward the adjuster stud 40, noting that an engagement portion 60 of the adjustment shaft 38 has a shaft diameter D1 and a length L1 (FIG. 3). The engagement portion 60 is in at least some embodiments, cylindrical, although in other embodiments other shapes can be utilized.

Referring to FIGS. 5-7B, a first embodiment of the adjuster extender 15 of the adjuster extender mechanism 10 is shown. The adjuster extender 15 includes an extender shaft 70 extending longitudinally between an extender stud 72 and a sleeve 74. In at least some embodiments, the extender shaft 70 reduces in diameter as it extends from the sleeve 74 towards the extender stud 72, and in at least some embodiments can include various stepped, tapered, beveled, and/or sloped transitions. Further in at least some embodiments, the extender shaft 70 is cylindrical and/or conical.

The sleeve 74 is generally tubular, and in at least some embodiments, includes an inner bore 76 having an inner bore wall 78 and a bore diameter D2. The inner bore 76 is at least in part, sized and shaped to receive the adjuster stud 40 therein, and matingly receive the engagement portion 60 of the adjustment shaft 38 therein. More particularly, the bore diameter D2 is slightly larger than the shaft diameter D1 in order to receive the engagement portion 60 therein while preventing or substantially preventing radial movement therebetween to provide rigid support of the adjuster extender 15 along the longitudinal axis 52 when secured to the adjustment shaft 38.

The sleeve 74 includes a plurality of engagement arms 80 having terminal arm ends 82 that are sized and shaped to engage the rear wall portion 58 of the adjuster stud 40 and to prevent, or substantially prevent, disengagement of the adjuster extender 15 from the adjustment shaft 38. In at least some embodiments, the engagement arms 80 extend at least partially within an arm aperture 83 formed in the sleeve 74. In addition, the inner bore 76 can include a wall stop 84 (FIG. 1B) that is sized and shaped to provide an abutment to at least a portion of the front wall portion 56 of the adjuster stud 40 and prevent or substantially prevent axial movement of the adjuster stud 40 towards the extender stud 72. In at least some embodiments, the engagement arms 80 are biased inwards such that upon insertion of the adjuster stud 40, the engagement arms 80 are pushed outwards against their natural bias by the front wall portion 56 of the adjuster stud 40, and when the front wall portion 56 passes the arm ends 82, the engagement arms 80 snap inward leaving the arm ends 82 biased against the rear wall portion 58. In this manner, the adjuster extender 15 is now axially secured to the adjustment shaft 38, via securement of the adjuster stud 40 between the wall stop 84 and the arm ends 82. In addition, the adjustment shaft 38 is also radially secured to the adjuster extender 15 via the engagement portion 60 of the adjustment shaft being in abutment with the inner bore 76 along its length. In addition to adding the adjuster extender 15 to the adjuster 20, a second adjuster extender 15 can be added to a first adjuster extender 15, as well as a third, a fourth, etc. as needed to obtain a specific length.

Various aspects of the adjuster extender mechanism 10 can be modified within the spirit of the invention, with several additional exemplary embodiments discussed below. As various elements maintain the same or similar form and/or function among these embodiments, many of the element numbers have been repeated, but with a letter designation thereafter for clarity (e.g., adjuster 20, adjuster 20a, adjuster 20b, etc.).

Figure 11:
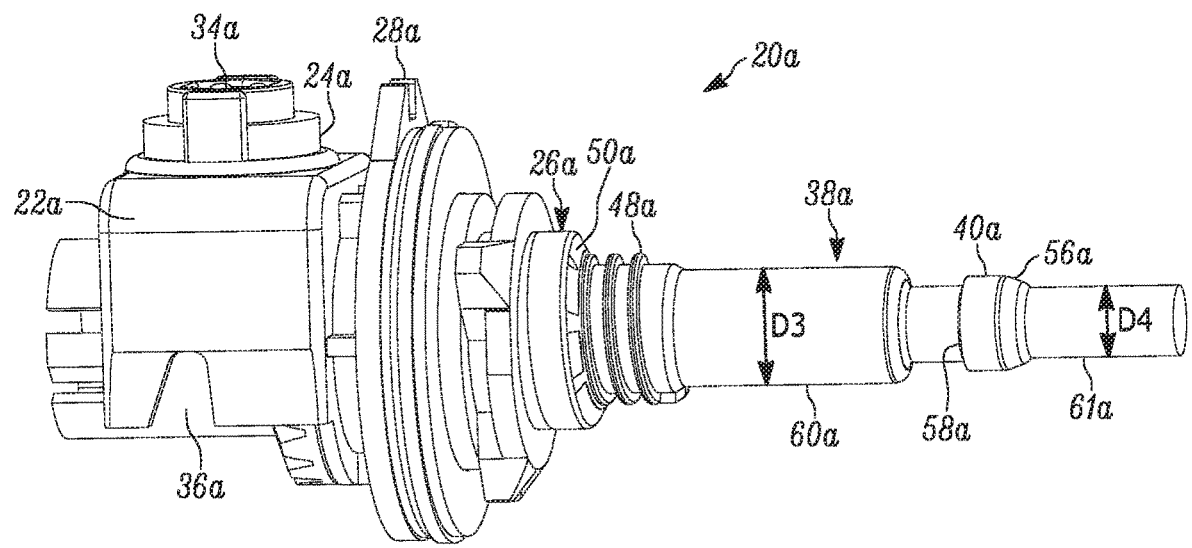
FIG. 11 is a side perspective view of an adjuster of FIG. 8A.
Figure 12:
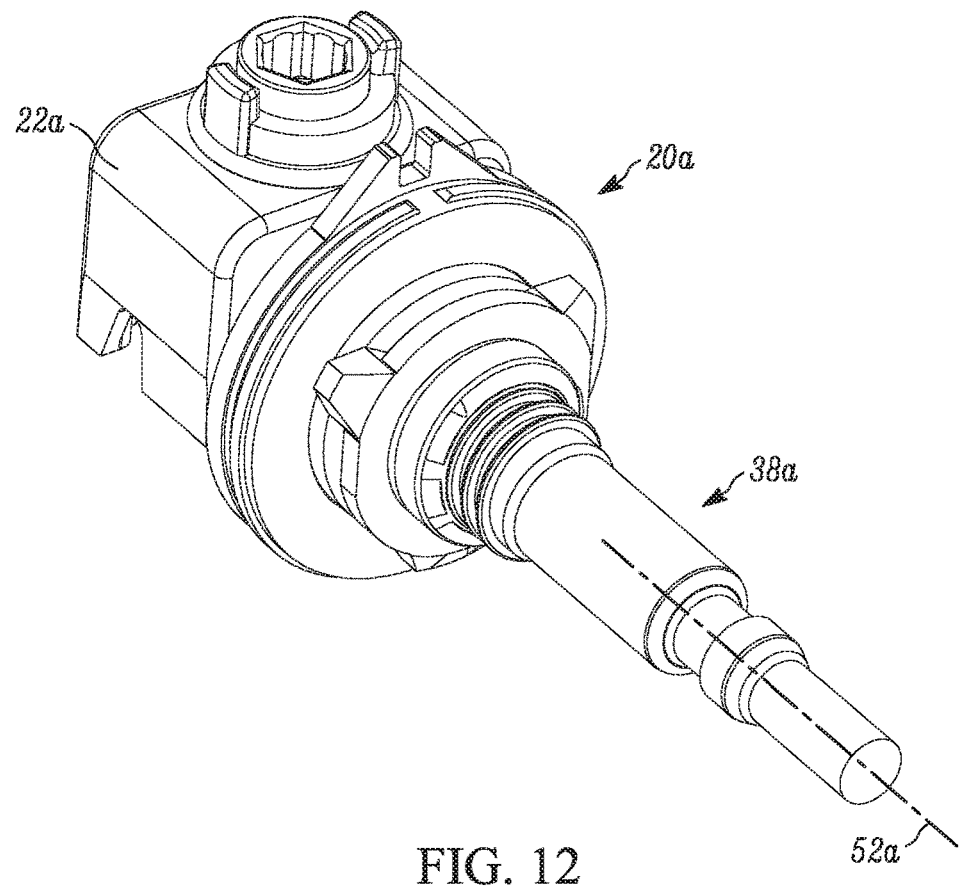
FIG. 12 is a front perspective view of the adjuster of FIG. 8A.
Figure 13:
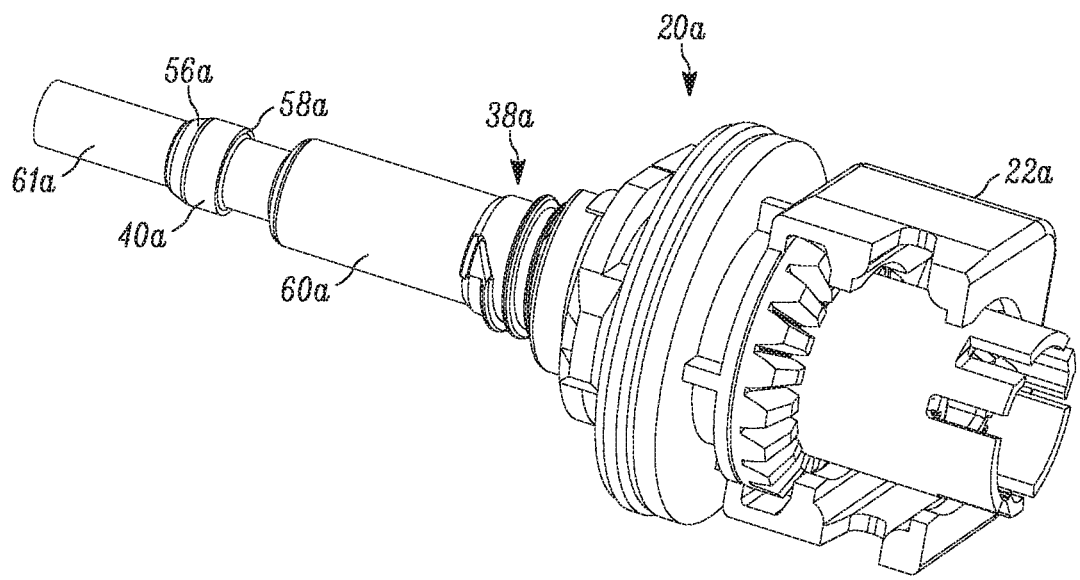
FIG. 13 is a bottom perspective view of the adjuster of FIG. 8A.
Figure 14A:
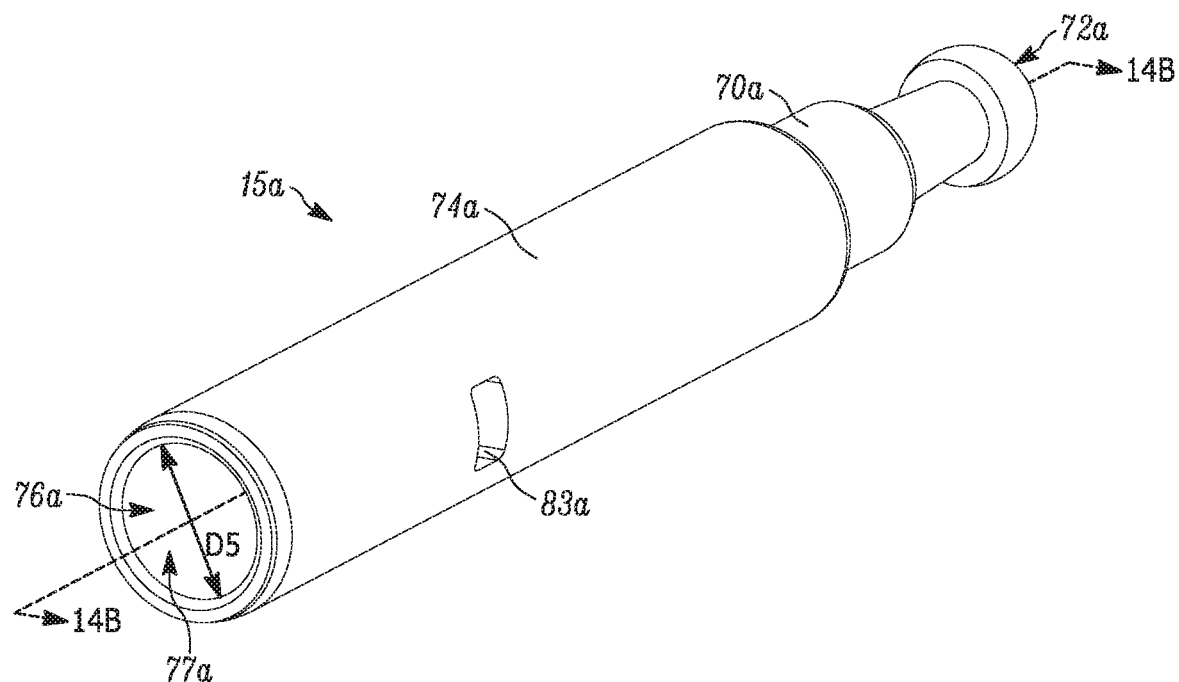
FIG. 14A is a rear perspective view of the adjuster extender of FIG. 8A.
Figure 14B:
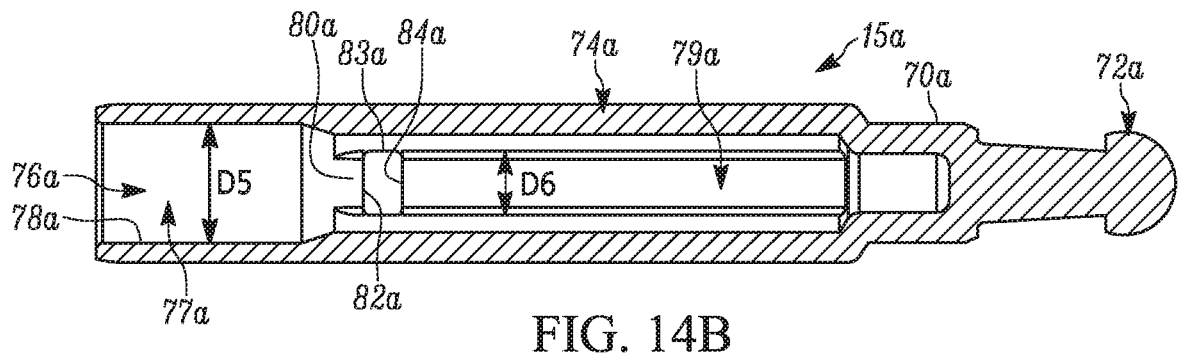
FIG. 14B is a side sectional view of the adjuster extender of FIG. 8A taken along lines 14B-14B of FIG. 14A.
Figure 15:
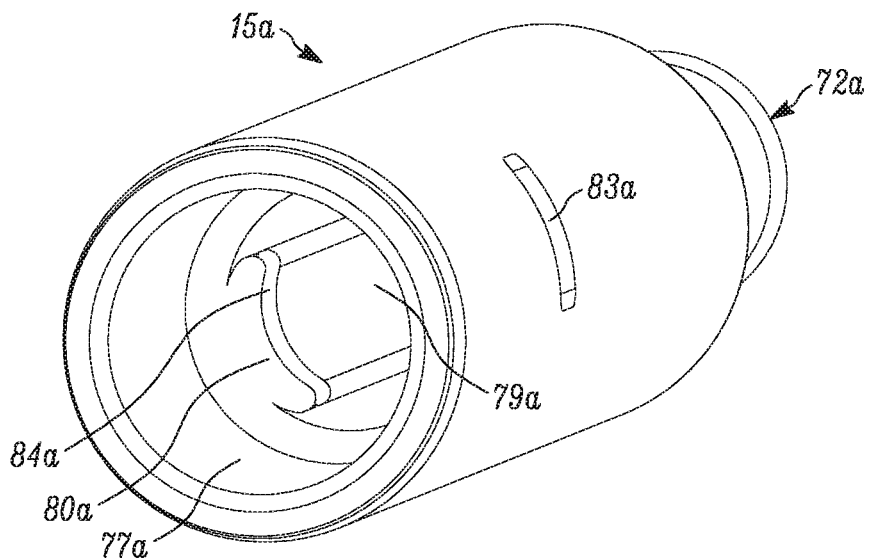
FIG. 15 is another rear perspective view of the adjuster extender of FIG. 8A.
Figure 16:
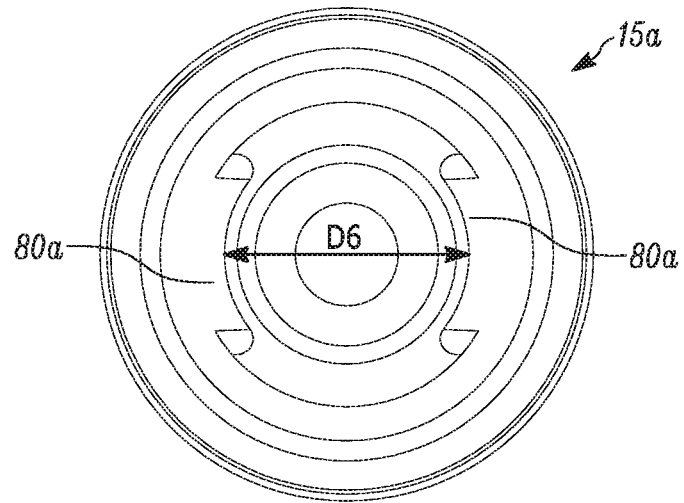
FIG. 16 is a rear view of the adjuster extender of FIG. 8A.

Referring now to FIGS. 8A-10 another embodiment of an adjuster extender mechanism 10a is shown, which includes an exemplary adjuster 20a and exemplary adjuster extender 15a. As noted above, the adjuster 20a can be similar in form and function to the adjuster 20 or another disclosed or equivalent adjuster, with the exception that the adjustment shaft 38a is modified to interface with the adjuster extender 15a. More particularly, referring to FIGS. 11-13, illustrating the adjuster 20a, the adjustment shaft 38a includes a first shaft engagement portion 60a having a diameter D3 and a second shaft engagement portion 61a having a diameter D4, wherein in at least some embodiments, they are both cylindrical. A adjuster stud 40a is situated along the second shaft engagement portion 61a, wherein the adjuster stud 40a includes a front wall portion 56a situated on the front of the adjuster stud 40a, and a rear wall portion 58a situated on the back of the adjuster stud 40a. The front wall portion 56a and rear wall portion 58a can include any one of numerous shapes and configurations, as discussed above with regard to the adjuster stud 40, wherein in at least some embodiments, the front wall portion 56a can be at least in part, sloped (e.g. tapered) to assist with installation of the adjuster extender 15a, and the rear wall portion 58a can be perpendicular to the longitudinal axis 52a to provide a flat or substantially flat abutment surface.

Referring to FIGS. 14A-16, various views of the exemplary adjuster extender 15a are provided. The adjuster extender 15a includes a cylindrical extender shaft 70a extending longitudinally between an extender stud 72a and a sleeve 74a. In at least some embodiments, the extender shaft 70a is cylindrical having a consistent diameter generally along its length, while in other embodiments, the extender shaft 70a can at least in part, reduce in diameter as it extends from the sleeve 74a towards the extender stud 72a, and in at least some embodiments can include various stepped, tapered, beveled, and/or sloped transitions. The sleeve 74a is generally tubular, and in at least some embodiments includes an inner bore 76a having a first bore portion 77a with a diameter D5 and a second bore portion 79a with a diameter D6.

The inner bore 76a is at least in part, sized and shaped to receive the adjuster stud 40a therein, and matingly receive the first shaft engagement portion 60a and second shaft engagement portion 61a of the adjustment shaft 38a. More particularly, the diameter D5 of the first bore portion 77a is slightly larger than the diameter D3 of the first shaft engagement portion 60a in order to receive the first shaft engagement portion 60a therein while preventing or substantially preventing radial movement therebetween to provide rigid support of the adjuster extender 15a when secured to the adjustment shaft 38a. Similarly, the diameter D6 of the second bore portion 79a is slightly larger than the diameter D4 of the second shaft engagement portion 61a in order to receive the second shaft engagement portion 61a matingly therein, providing further radial support.

The sleeve 74a also includes a plurality of engagement arms 80a that are sized and shaped to engage the rear wall portion 58a of the adjuster stud 40a and to prevent or substantially prevent disengagement of the adjuster extender 15a from the adjustment shaft 38a. In at least some embodiments, the engagement arms 80a include arm ends 82a and are formed from tapered sections of the first bore portion 77a, which extend inward to create an outwardly moveable barrier to the front wall portion 56a of the adjuster stud 40a during insertion, and provide a rigid barrier via the arm ends 82a through abutment with the rear wall portion 58a after full insertion. In addition, the inner bore 76a can include a wall stop 84a that is sized and shaped to provide an abutment to the front wall portion 56a of the adjuster stud 40a, to further prevent or substantially prevent axial movement of the adjuster stud 40a along the longitudinal axis 52a. Arm apertures 83a can be formed in the sleeve 74a to provide additional flexibility to the engagement arms 80a, allowing them to be pushed (flex) outwards during insertion of the adjuster stud 40a without exerting undue stress on the sleeve 74a.

Figure 17A:
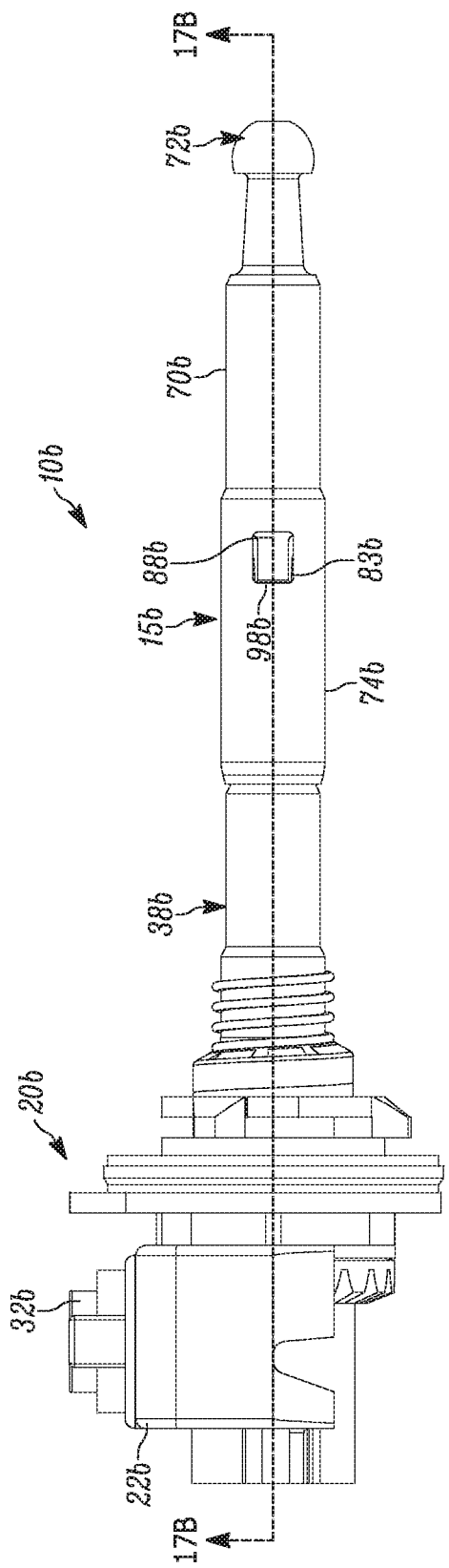
FIG. 17A is a side view of yet another exemplary embodiment of an adjuster extender mechanism.
Figure 17B:
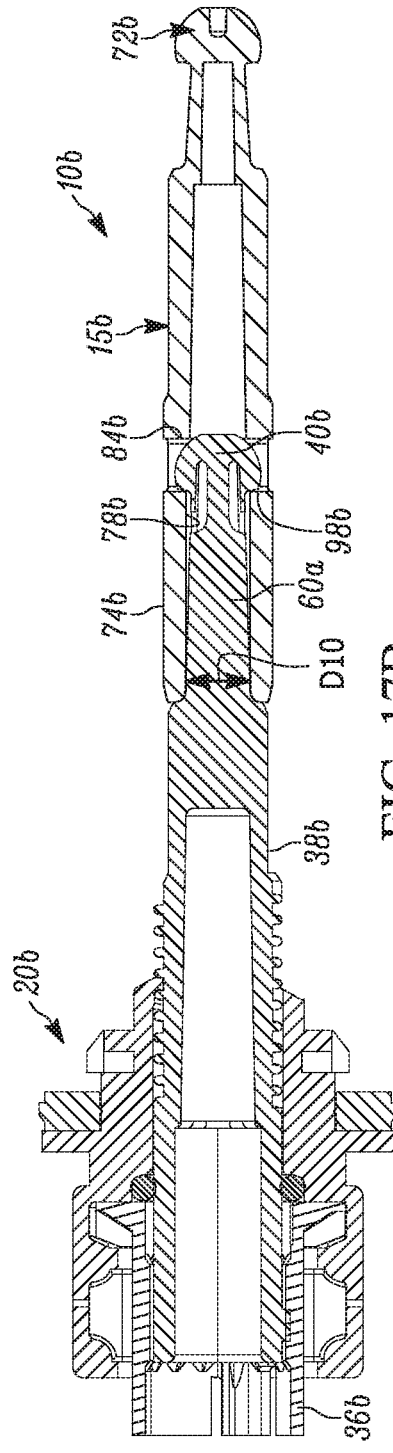
FIG. 17B is a bottom sectional view of the adjuster extender mechanism taken along lines 17B-17B of FIG. 17A.
Figure 18:
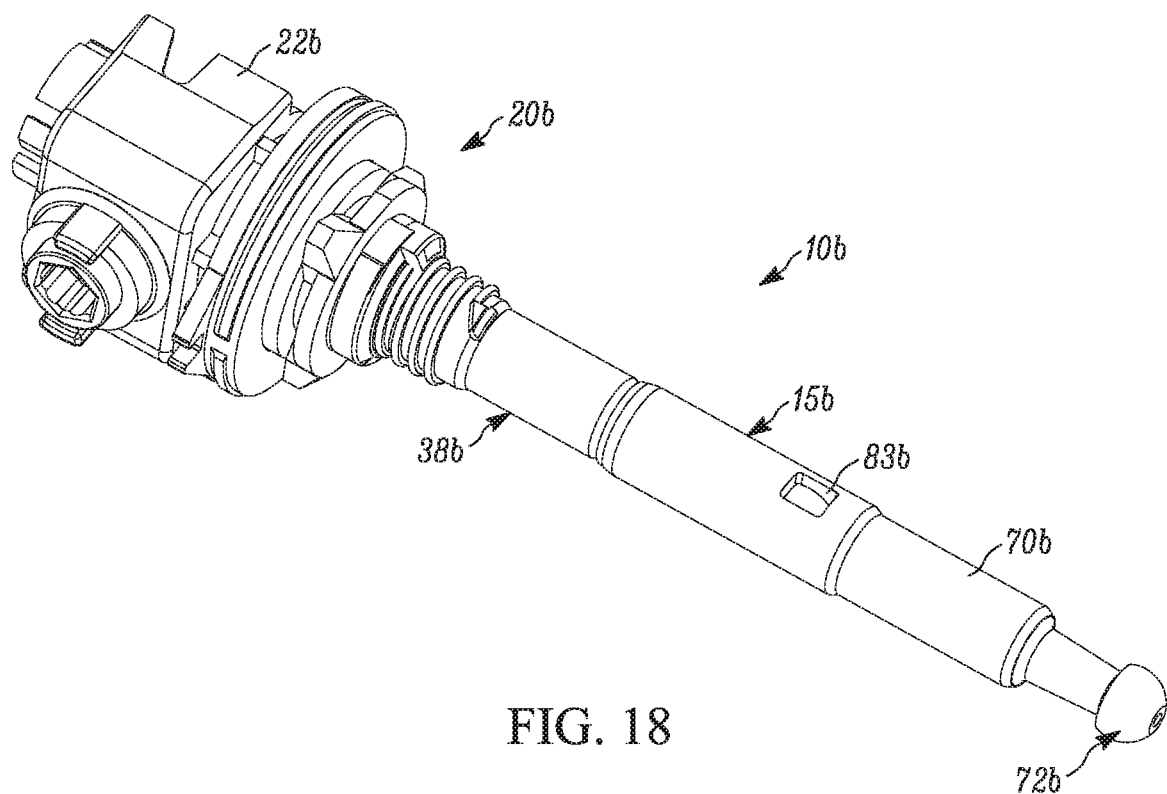
FIG. 18 is a top perspective view of the adjuster extender mechanism of FIG. 17A.
Figure 19:
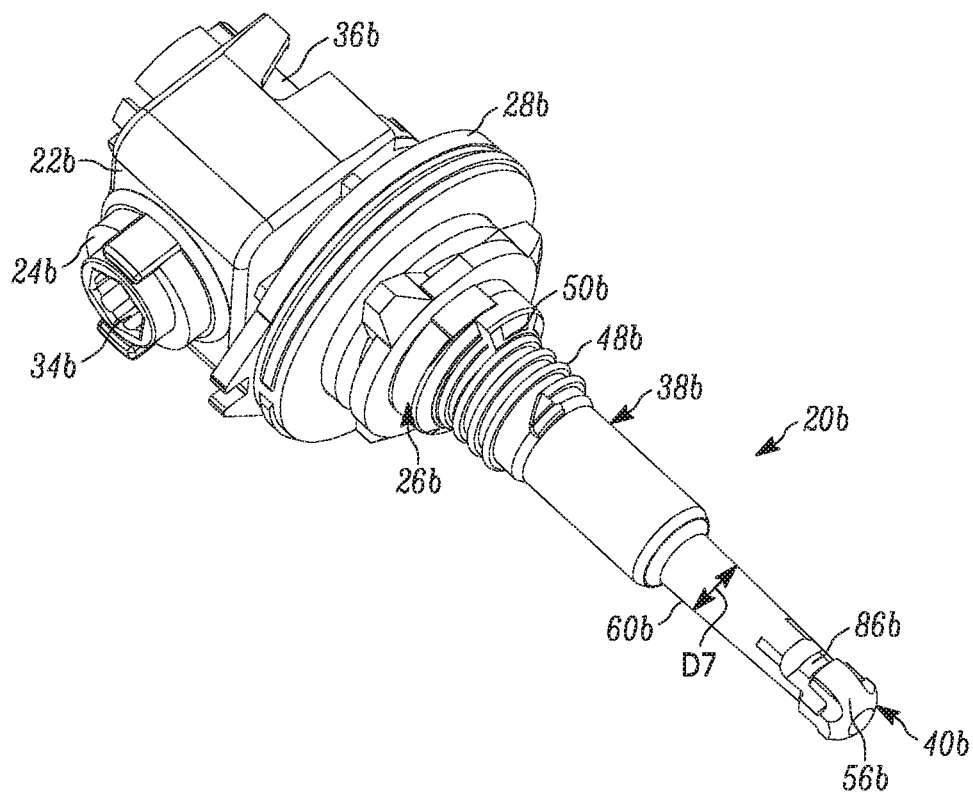
FIG. 19 is a side perspective view of an adjuster of FIG. 17A.
Figure 20:
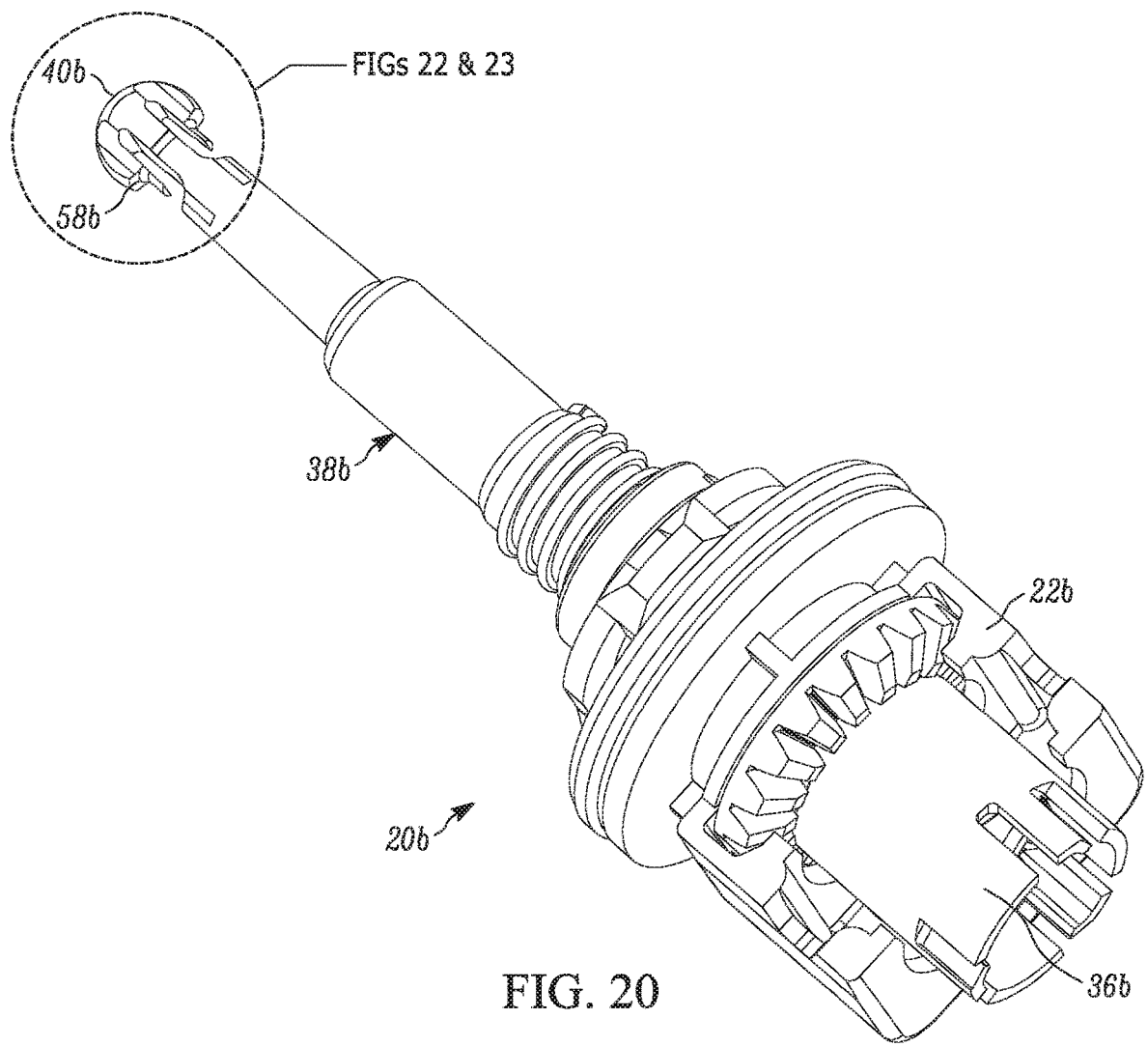
FIG. 20 is a bottom perspective view of the adjuster of FIG. 17A.
Figure 21:
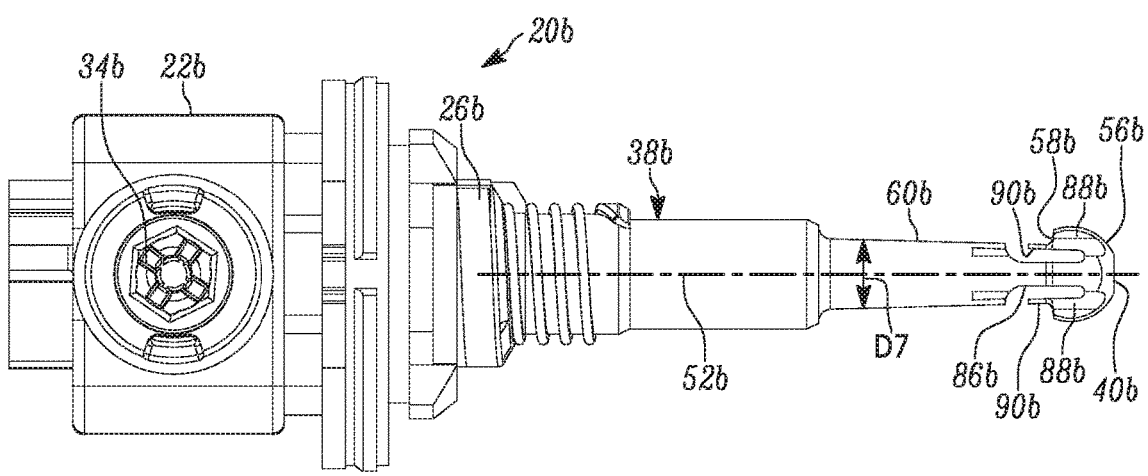
FIG. 21 is a top view of the adjuster of FIG. 17A.
Figure 22:
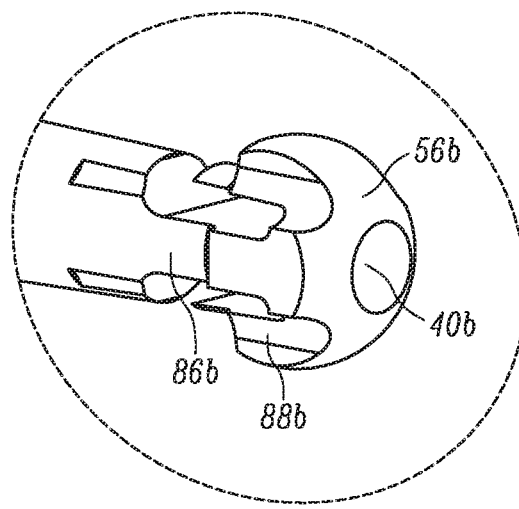
FIG. 22 is a perspective partial view of the adjuster of FIG. 20.
Figure 23:
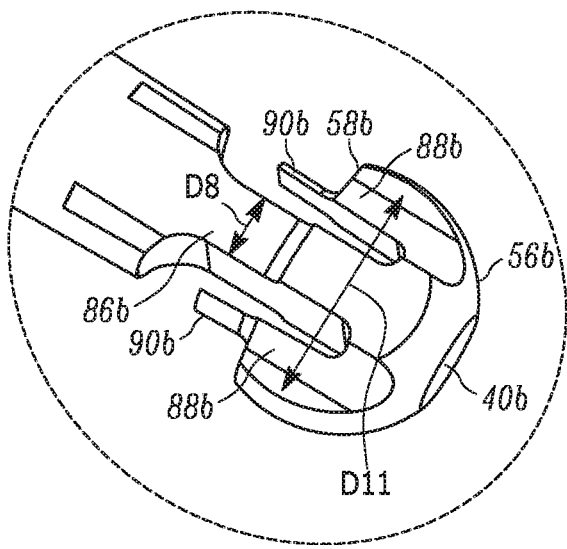
FIG. 23 is another perspective partial view of the adjuster of FIG. 20.
Figure 24A:
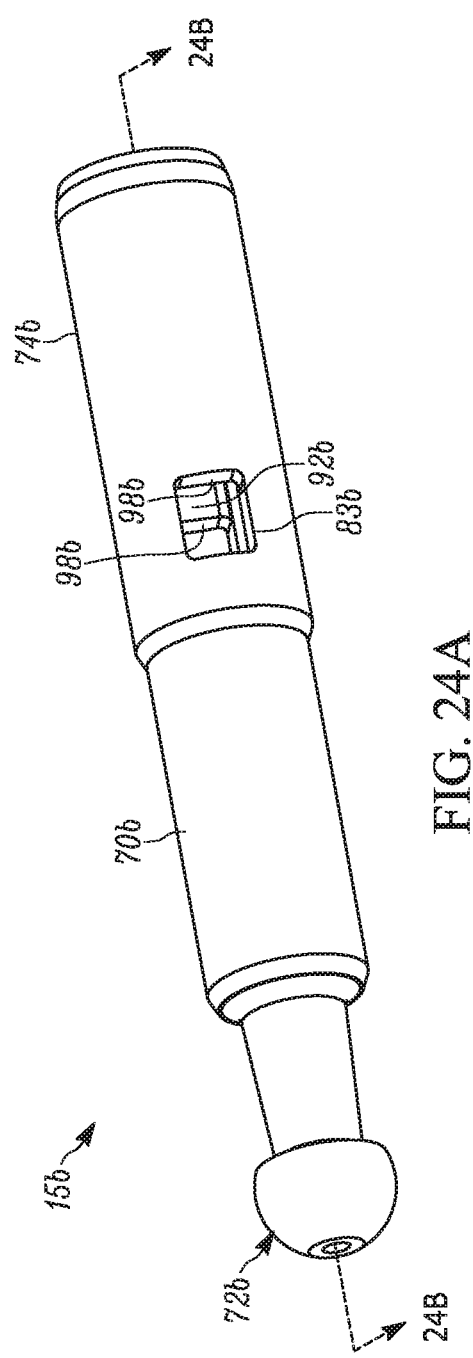
FIG. 24A is a front perspective view of the adjuster extender of FIG. 17A.
Figure 24B:
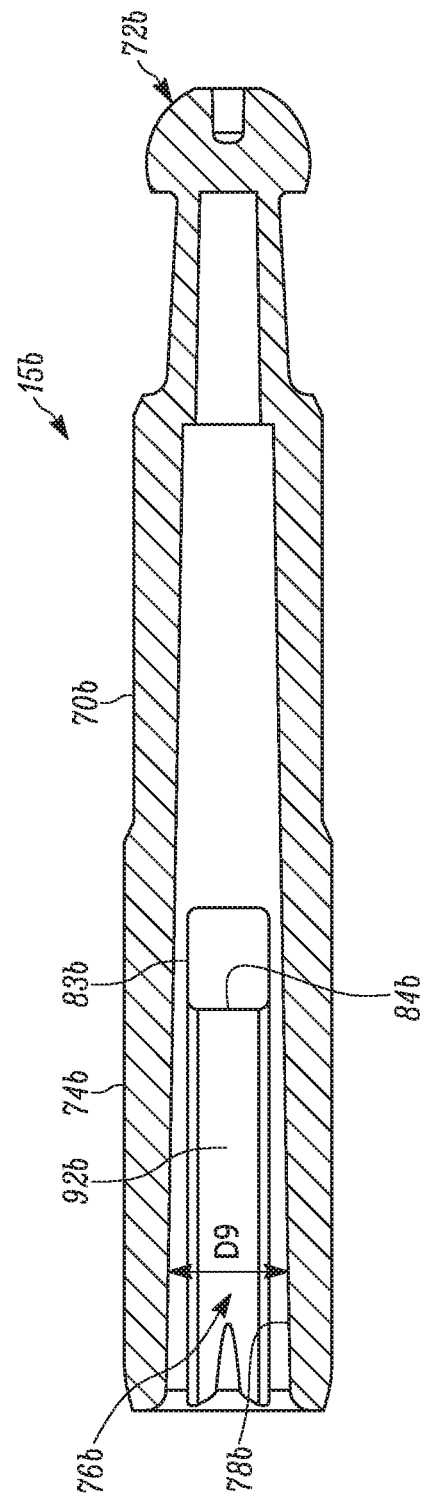
FIG. 24B is a side sectional view of the adjuster extender taken along lines 24B-24B of FIG. 24A.
Figure 25:
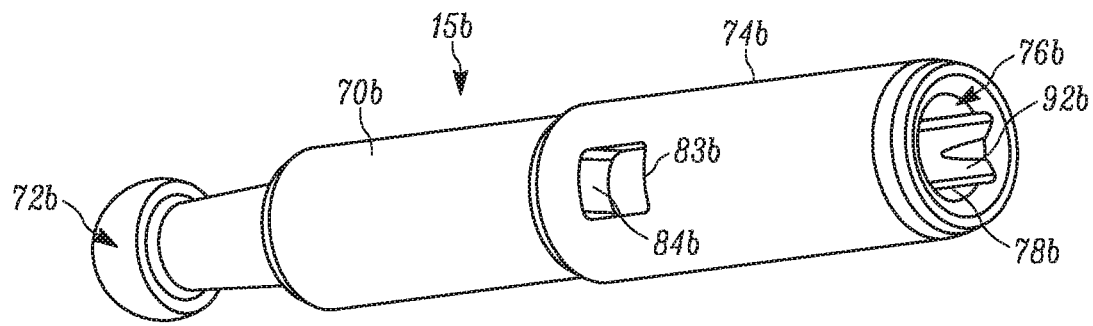
FIG. 25 is a rear perspective view of the adjuster extender of FIG. 17A.
Figure 26:
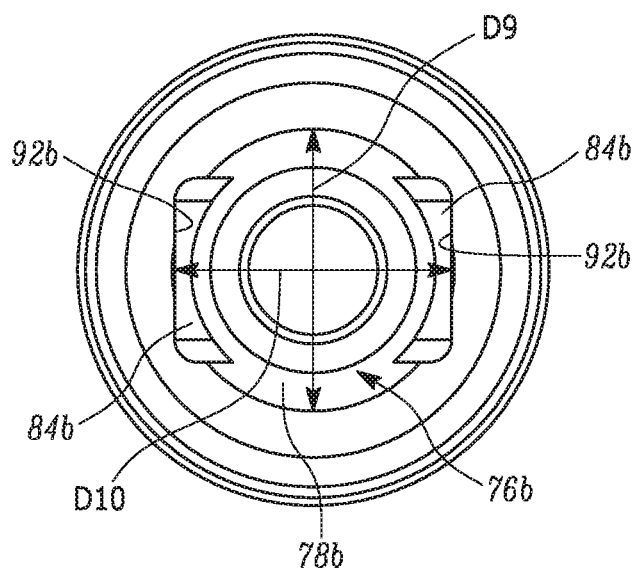
FIG. 26 is a rear view of the adjuster extender of FIG. 17A.

Referring now to FIGS. 17A-18, another embodiment of an adjuster extender mechanism 10b is shown, which includes an exemplary adjuster 20b and exemplary adjuster extender 15b, which are further illustrated in FIGS. 19-26. As noted above, the adjuster 20b can be similar in form and function to the adjuster 20 or another disclosed or equivalent adjuster, with the exception that the adjustment shaft is modified to interface with the adjuster extender 15b. More particularly, adjustment shaft 38b includes a shaft engagement portion 60b that is tapered, such that its diameter D7 reduces as it extends towards a adjuster stud 40b, wherein in at least some embodiments, the shaft engagement portion 60b is cylindrical, while other shapes and configurations are also contemplated. The adjuster stud 40b includes a front wall portion 56b situated about the front of the adjuster stud 40b and a rear wall portion 58b situated on the back of the adjuster stud 40b. The front wall portion 56b and a rear wall portion 58b can include any one of numerous shapes and configurations, as discussed above with regard to adjuster stud 40. In at least some embodiments, the front wall portion 56b is at least in part sloped to assist with installation of the adjuster extender 15b, while the rear wall portion 58b can be perpendicular or substantially perpendicular to a longitudinal axis 52b (see FIGS. 21 and 23) of the adjustment shaft 38b.

As shown in FIGS. 17B-23, the adjustment shaft 38b further includes a neck portion 86b that extends between the shaft engagement portion 60b and the adjuster stud 40b. The neck portion 86b includes a reduced diameter D8 (FIG. 23) along at least one axis perpendicular to the longitudinal axis 52b. The adjuster stud 40b further includes a plurality of latching arms 88b having arm tabs 90b.

Referring to FIGS. 24A-26, the adjuster extender 15b includes a cylindrical extender shaft 70b extending longitudinally between an extender stud 72b and a sleeve 74b. In at least some embodiments, the extender shaft 70b reduces in diameter as it extends from the sleeve 74b towards the extender stud 72b, and in at least some embodiments can include various stepped, tapered, beveled, and/or sloped transitions. The sleeve 74b is generally tubular, and in at least some embodiments, includes an inner bore 76b having a first diameter D9 (FIG. 26) and a second diameter D10 extending between a pair of opposing arm channels 92b configured to receive the latching arms 88b and to provide an orientation fit and additional rotational support. The diameter D9 is in at least some embodiments tapered to matingly receive the shaft engagement portion 60b. In at least some embodiments, the inner bore 76b can be tapered along one or more portions.

The inner bore 76b is at least in part, sized and shaped to receive the adjuster stud 40b therein, and matingly receive the shaft engagement portion 60b of the adjustment shaft 38b. More particularly, the diameter D9 of the inner bore 76b is slightly larger than the diameter D7 of the shaft engagement portion 60b in order to receive the shaft engagement portion 60b therein while preventing or substantially preventing radial movement therebetween to provide rigid support of the adjuster extender 15b when secured to the adjustment shaft 38b. Similarly, the diameter D10 of the inner bore 76b is slightly larger than the maximum distance D11 that can extend between the latching arms 88b when in a compressed state, such that when compressed inward during insertion they may be received within the arm channels 92b.

The sleeve 74b also includes a plurality of arm apertures 83b to at least partially receive the latching arms 88b therein and thereby prevent or substantially prevent disengagement of the adjuster extender 15b from the adjustment shaft 38b. The adjuster extender 15b is inserted over the adjustment shaft 38b until the front wall portion 56b of the adjuster stud 40b abuts a wall stop 84b that is sized and shaped to provide an abutment to the front wall portion 56b of the adjuster stud 40b and prevent or substantially prevent axial movement of the adjuster stud 40b towards the extender stud 72b. As the latching arms 88b pass along the arm channels 92b through the inner bore 76b, the latching arms 88b are compressed inwards about the reduced diameter of the neck portion 86b. Once the compressed latching arms 88b are aligned with the arm apertures 83b, they spring outwards from the compression bias and at least partially into the arm apertures 83b, with the arm tabs 90b resting on the arm channels 92b. In this manner the rear wall portion 58b of the adjuster stud 40b is abutted with a brace wall 98b of each arm aperture 83b, such that the adjuster stud 40b is secured between the wall stop 84b and brace walls 98b, to prevent or substantially prevent axial movement between the adjustment shaft 38b and the adjuster extender 15b.

Figure 27A:
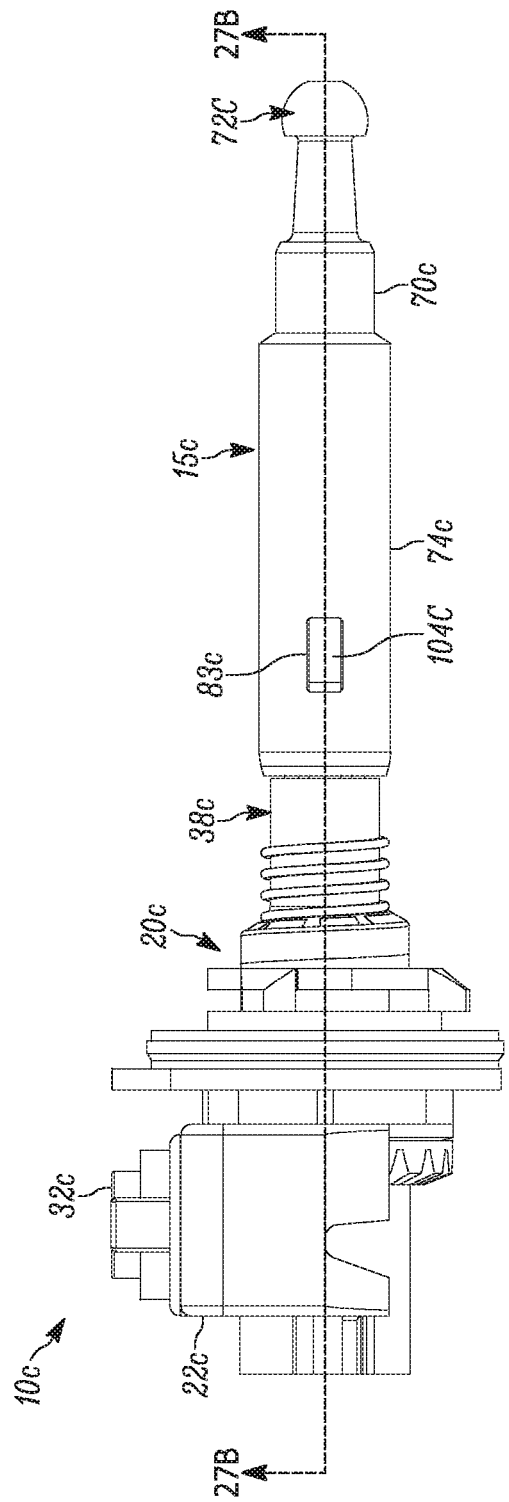
FIG. 27A is a side view of a still yet another exemplary embodiment of an adjuster extender mechanism.
Figure 27B:
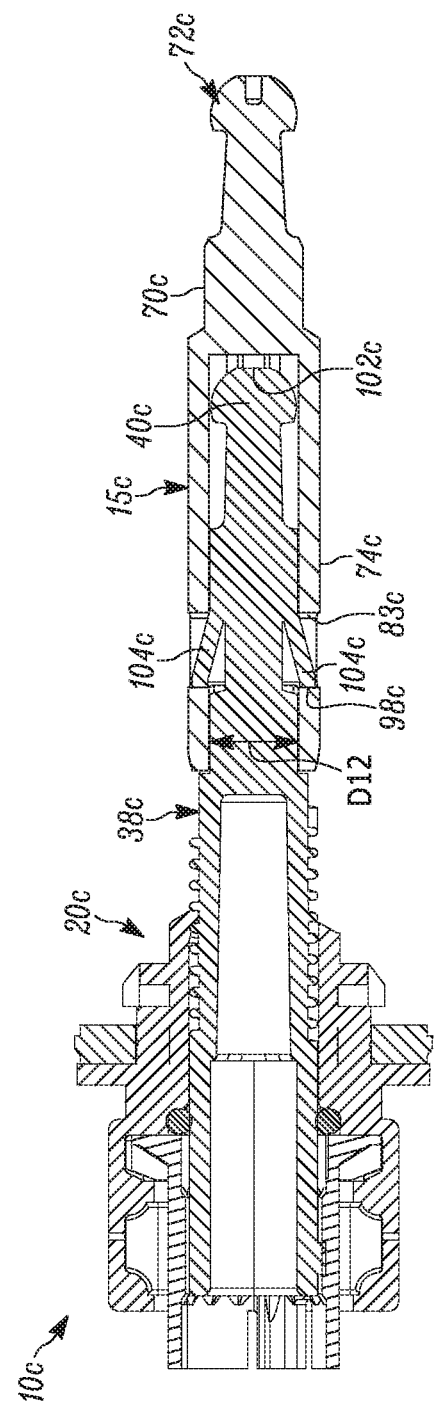
FIG. 27B is a bottom sectional view of the adjuster extender mechanism taken along lines 27B-27B of FIG. 27A.
Figure 28:
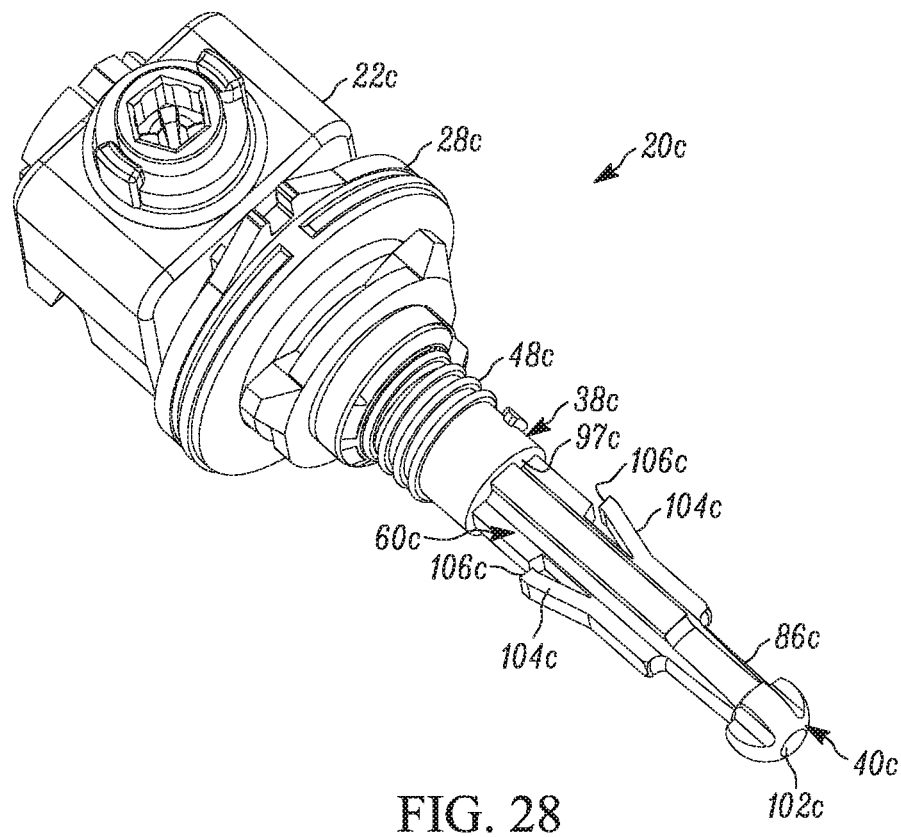
FIG. 28 is a top perspective view of an adjuster of FIG. 27A.
Figure 29:
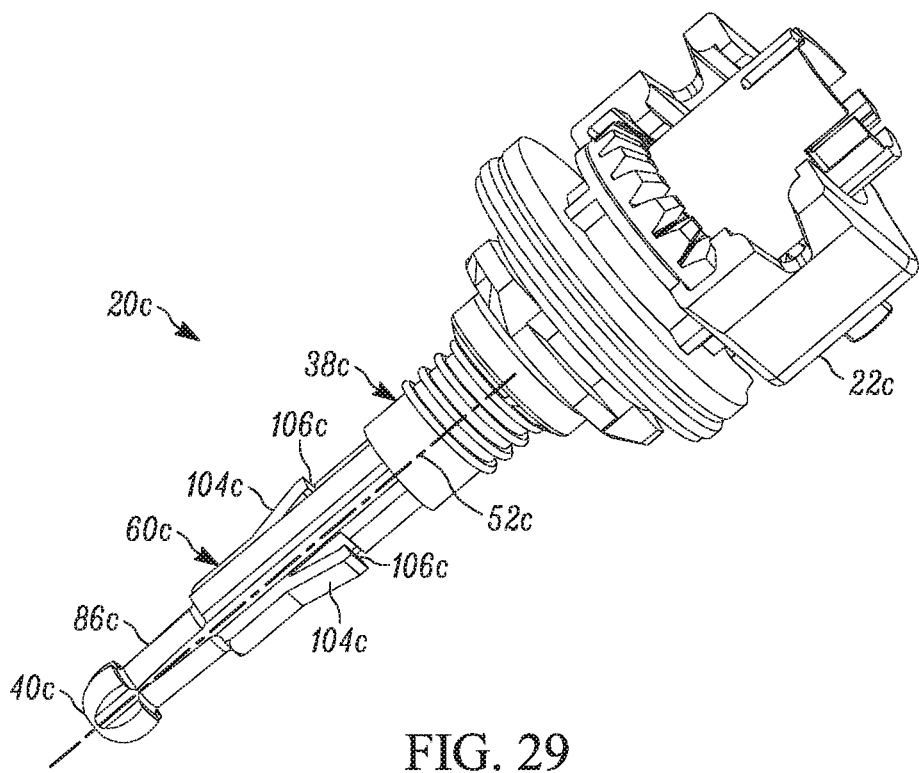
FIG. 29 is a bottom perspective view of the adjuster of FIG. 27A.
Figure 30:
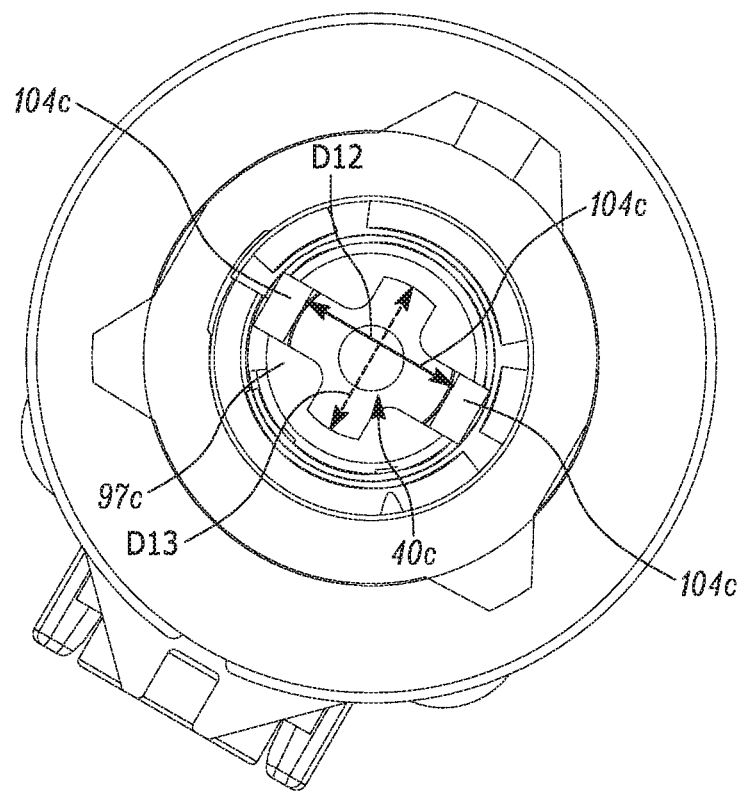
FIG. 30 is a front view of the adjuster of FIG. 27A.
Figure 31:
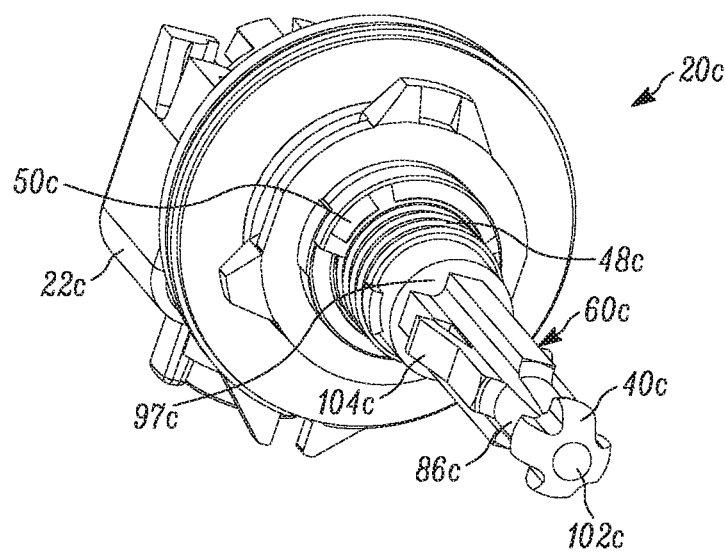
FIG. 31 is a front perspective view of the adjuster of FIG. 27A.
Figure 32A:
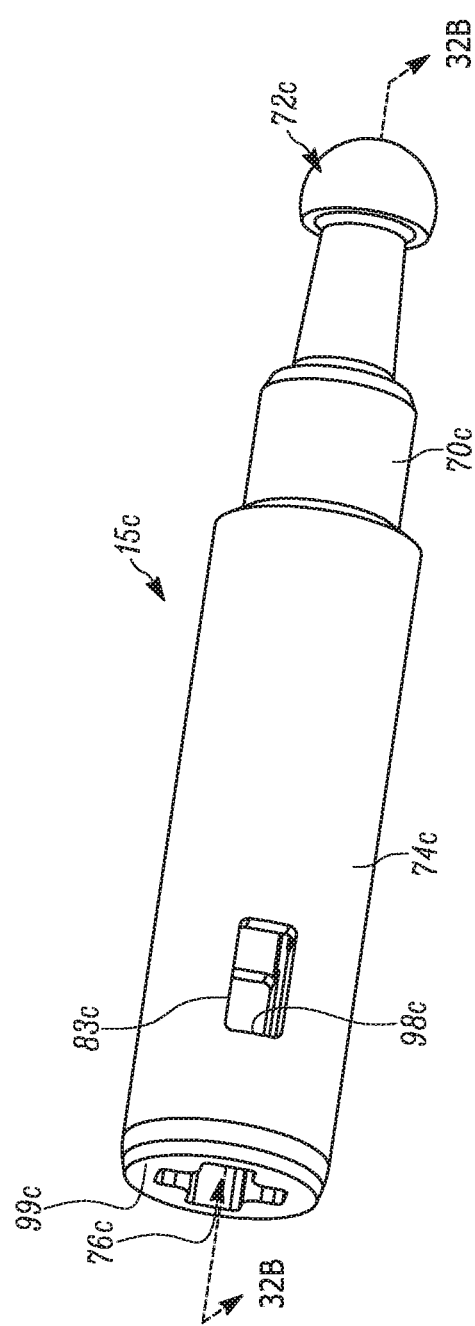
FIG. 32A is a side perspective view of an adjuster extender of FIG. 27A.
Figure 32B:
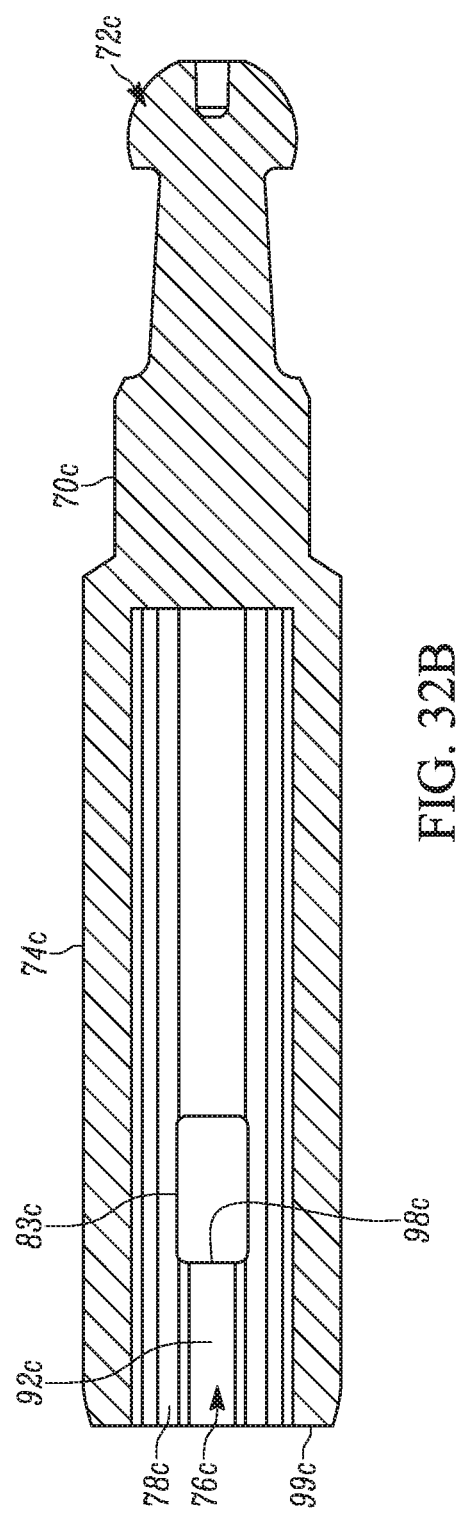
FIG. 32B is a side sectional view of the adjuster extender taken along lines 32B-32B of FIG. 32A.
Figure 33:
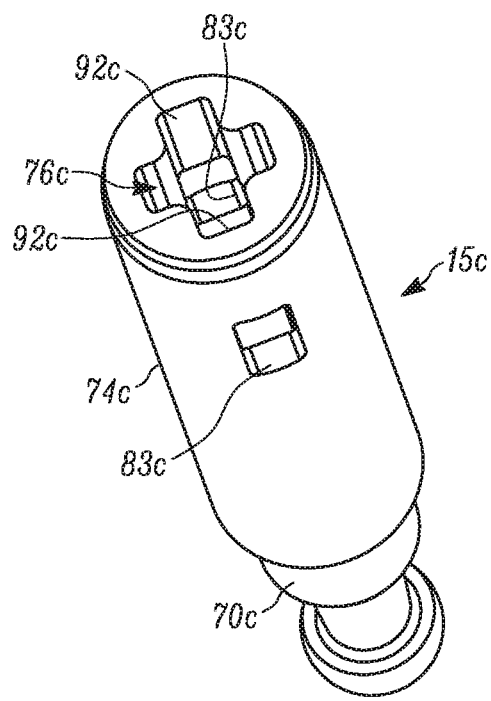
FIG. 33 is a rear perspective view of the adjuster extender of FIG. 27A.
Figure 34:
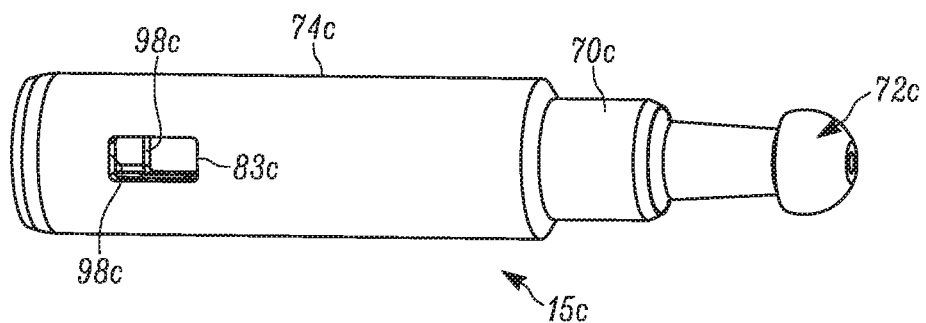
FIG. 34 is a side perspective view of the adjuster extender of FIG. 27A.
Figure 35E:
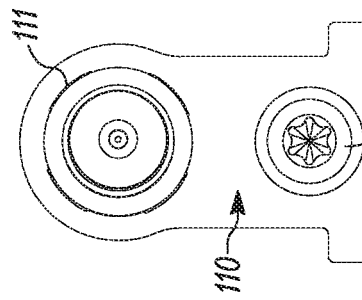
FIG. 35E is a front view of the adjuster extender and retaining bracket of FIG. 35A.
Figure 35D:
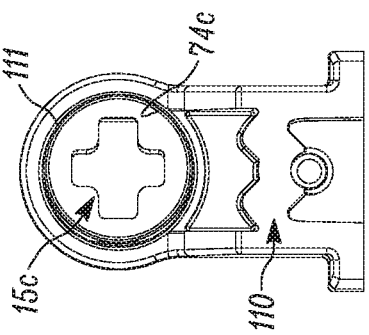
FIG. 35D is a rear view of the adjuster extender and retaining bracket of FIG. 35A.
Figure 35B:
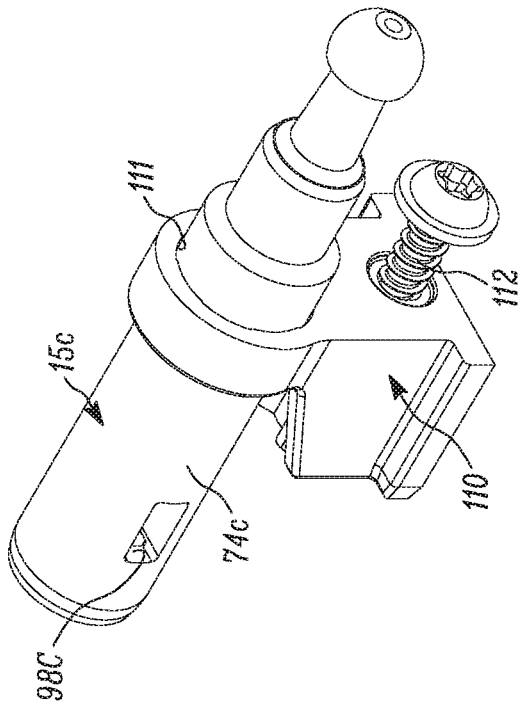
FIG. 35B is a front perspective view of the adjuster extender and retaining bracket of FIG. 35A.
Figure 35C:
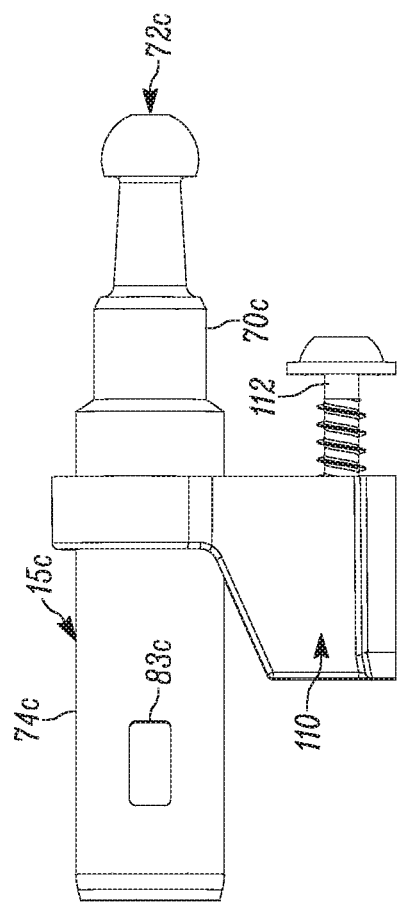
FIG. 35C is a side view of the adjuster extender and retaining bracket of FIG. 35A.
Figure 35A:
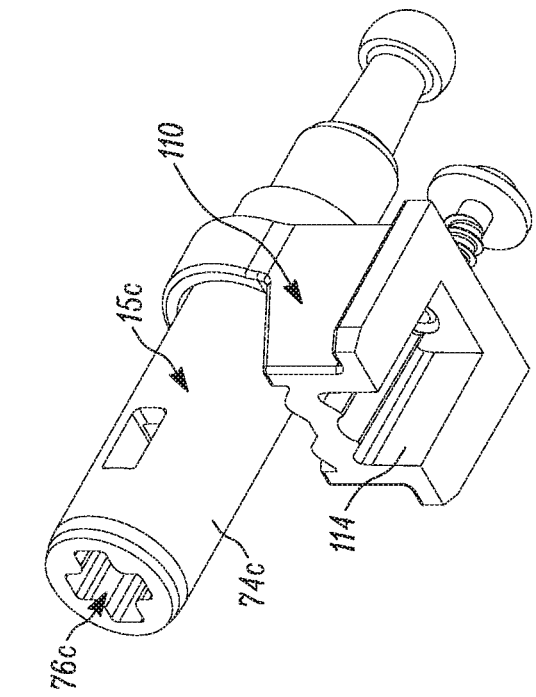
FIG. 35A is a rear perspective view of a yet further additional exemplary embodiment of an adjuster extender that includes a retaining bracket.

Referring now to FIGS. 27A-27B, another embodiment of an adjuster extender mechanism 10c is shown, which includes an exemplary adjuster 20c and exemplary adjuster extender 15c, as further illustrated in FIGS. 28-34. As noted above, the adjuster 20c can be similar in form and function to the adjuster 20 or another disclosed or equivalent adjuster, with the exception that the adjustment shaft is modified to interface with the adjuster extender 15c. More particularly, adjustment shaft 38c has a longitudinal axis 52c (FIG. 29) and includes a shaft engagement portion 60c, wherein in at least some embodiments, the shaft engagement portion 60c has a generally cross-shaped cross-section with a first diameter D12 and second diameter D13, wherein the diameters D12 and D13 are shown as being the same, although in other embodiments, they can differ and other shapes of the shaft engagement portion 60c are contemplated. A stop wall 97c is formed on the adjustment shaft 38 at the base of the shaft engagement portion 60c, and in at least some embodiments extends perpendicular to the longitudinal axis 52c. An adjuster stud 40c is provided that is connected to the shaft engagement portion 60c via a neck portion 86c. The neck portion 86c can include a reduced diameter relative to the shaft engagement portion 60c. The adjuster stud 40c includes an end wall 102c situated on the front of the adjuster stud 40c. The shaft engagement portion 60c further includes a plurality of arms 104c having arm stops 106c. As configured, the arms 104c are biased outwards from the shaft engagement portion 60c.

Referring to FIGS. 32A-34, the adjuster extender 15c includes a cylindrical extender shaft 70c extending longitudinally between an extender stud 72c and a sleeve 74c. In at least some embodiments, the extender shaft 70c reduces in diameter as it extends from the sleeve 74c towards the extender stud 72c, and in at least some embodiments can include various stepped, tapered, beveled, and/or sloped transitions. The sleeve 74c is generally tubular, and in at least some embodiments, includes an inner bore 76c that is cross-shaped and sized and shaped to matingly receive the shaft engagement portion 60c therein to prevent or substantially prevent radial movement between the shaft engagement portion 60c and the sleeve 74c, while providing rigid support of the adjuster extender 15c when secured to the adjustment shaft 38c. The inner bore 76c further includes opposing arm channels 92c for passage of the arms 104c therethrough. The sleeve further includes a sleeve end wall 99c.

The sleeve 74c also includes a plurality of arm apertures 83c to at least partially receive the arms 104c to prevent or substantially prevent disengagement of the adjuster extender 15c from the adjustment shaft 38c. The adjuster extender 15c is inserted over the adjustment shaft 38c until the sleeve end wall 99c abuts or is adjacent to the stop wall 97c of the adjuster stud 40c, to prevent or substantially prevent axial movement of the adjuster stud 40c towards the extender stud 72c. During insertion, as the arms 104c pass through the inner bore 76c, the arms 104c are compressed inwards by the arm channels 92c. The arms 104c each include end arm stops 106c, and when the end arm stops 106c reach the arm apertures 83c in the sleeve 74c, they spring outwards from the compression bias and at least partially into the arm apertures 83c, with the end arm stops 106c abutted with brace walls 98c in the arm apertures 83c to interlock the adjustment shaft 38c with the adjuster extender 15c. In this manner, the adjustment shaft 38c is secured by the end arm stops 106c abutting the brace walls 98c to prevent or substantially prevent axial movement between the adjustment shaft 38c and the adjuster extender 15c.

Referring now to FIGS. 35A-35E, the adjuster extender 15c is show with a retainer bracket 110 secured thereto. The retainer bracket 110 includes a circular aperture 111 that is sized and shaped to receive and secure the sleeve 74c, although in other embodiments, the retainer bracket 110 can be secured to other portions of the adjuster extender 15c in other ways. The retainer bracket 110 can include a fastener 112 for securing the retainer bracket 110 to a mounting surface of a vehicle to provide additional radial support for the adjuster extender 15c. The retainer bracket 110 can also include a channel 114 that is shaped and sized to matingly engage with a portion of the vehicle mounting surface to further secure the retainer bracket 110. In at least some embodiments, the retainer bracket 110 can be integrally formed with the adjuster extender 15c. The retainer bracket 110 is shown with the adjuster extender 15c, but can be utilized with any other adjuster extender embodiments disclosed herein or otherwise.

Figure 36A:
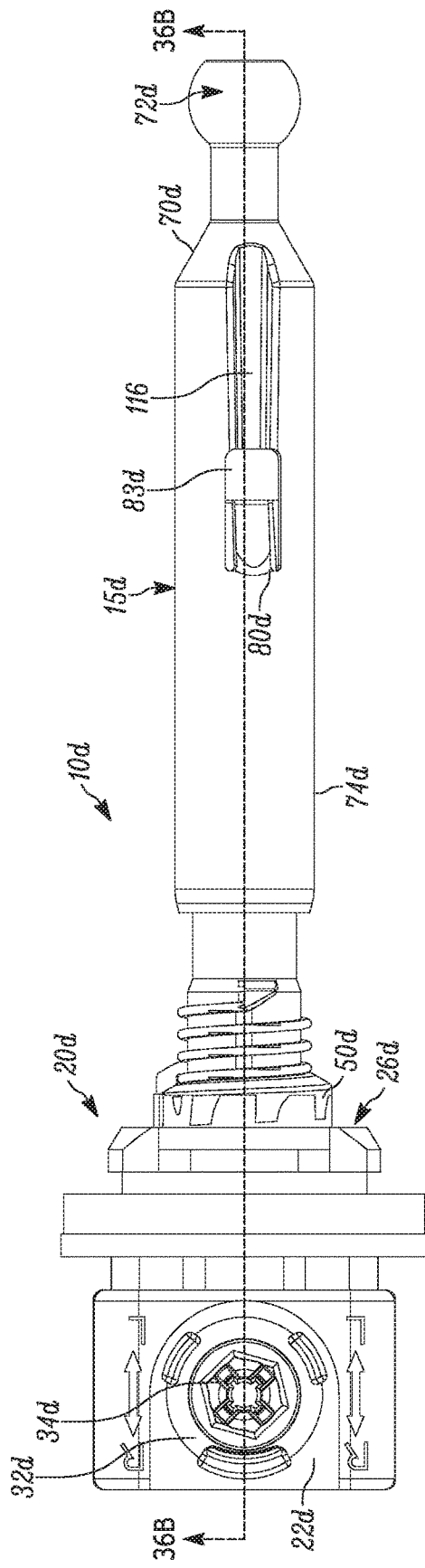
FIG. 36A is a top view of a still yet further additional exemplary embodiment of an adjuster extender mechanism.
Figure 36B:
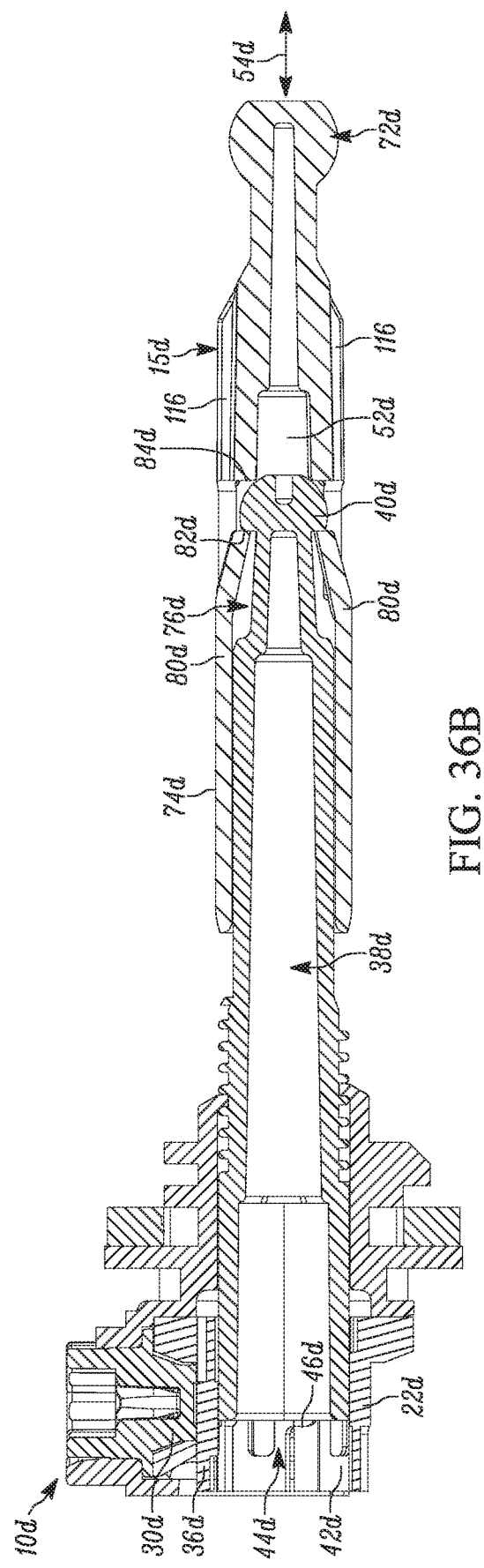
FIG. 36B is a side sectional view of the adjuster extender mechanism taken along lines 36B-36B of FIG. 36A.

Referring now to FIGS. 36A-36B, another exemplary embodiment of an adjuster extender mechanism 10d is shown. The adjuster extender mechanism 10d includes an adjuster extender 15d and an adjuster 20d (as seen in FIG. 37). As shown, the adjuster extender mechanism 10d is similar to the adjuster extender mechanism 10, although the rear wall portion 58d situated on the back of adjuster stud 40d of the adjustment shaft 38d of the adjuster 20d is flat or substantially flat (as opposed to curved), extending perpendicular or substantially perpendicular to the longitudinal axis 52d (see FIG. 37) of the adjustment shaft 38d. This configuration can provide a greater positive engagement with the arm ends 82d to prevent release of the adjuster extender 15d. In addition, the adjuster extender includes a pair of grooves 116 that extend along opposite sides of a tubular sleeve 74d. In at least some embodiments, the grooves 116 can take numerous forms and can be reduced or increased in number. Also, the extender stud 72d includes a more spherical shape, and the extender shaft 70d is tapered in part.

Figure 38A:
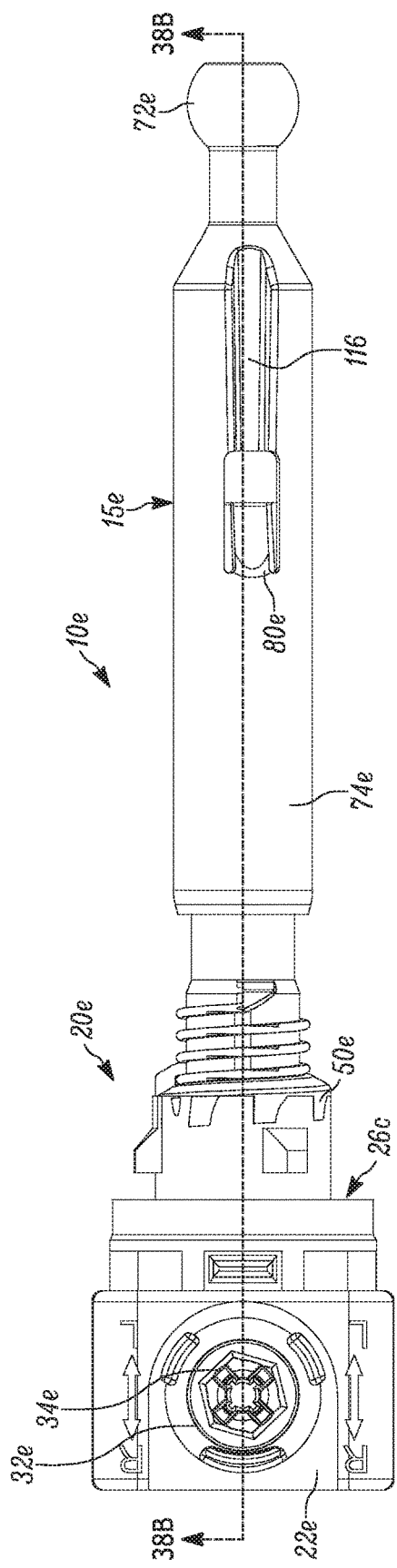
FIG. 38A is a top view of yet another additional exemplary embodiment of an adjuster extender mechanism.
Figure 38B:
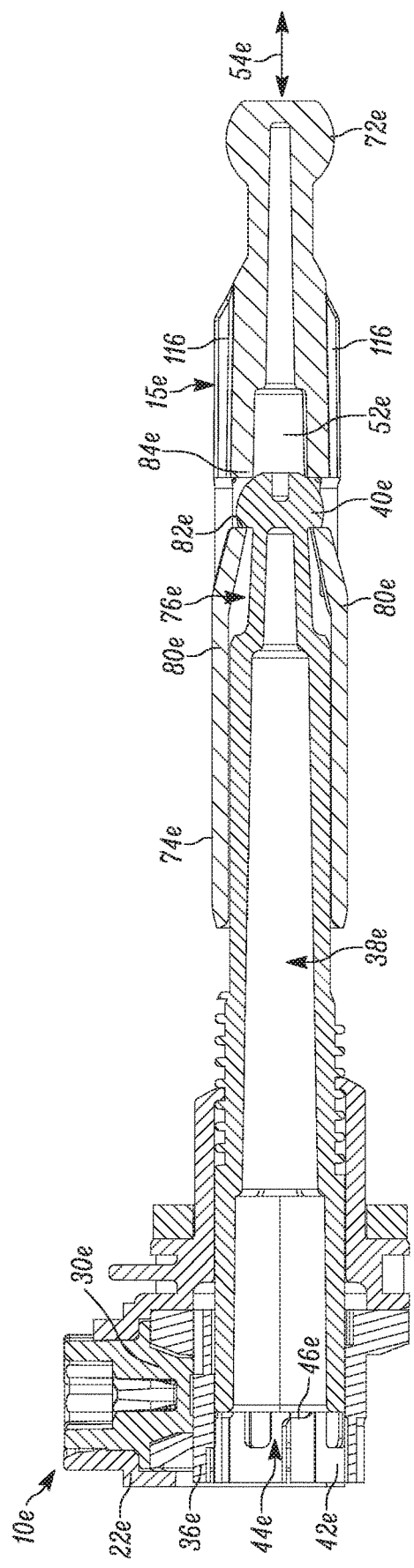
FIG. 38B is a side sectional view of the adjuster extender mechanism taken along lines 38B-38B of FIG. 38A.

Referring now to FIGS. 38A-38C, another exemplary embodiment of an adjuster extender mechanism 10e is shown. The adjuster extender mechanism 10e includes an adjuster extender 15e and an adjuster 20e (as seen in FIG. 39). The adjuster extender 15e is identical to the adjuster extender 15d, although the adjuster 20e differs from the adjuster 20d only in shape. As such, the adjuster extender mechanism 10e functions similar to the adjuster extender mechanism 10d. Further, as discussed above, any of the extender studs (e.g., 40, 40b, 40e, etc.) shown herein with a curved rear wall portion can be configured with a flat rear wall portion (e.g., FIGS. 37 and 39) instead.

Various similar elements are provided with similar names and/or numbers and may not be referenced with greater detail, though it should be assumed that absent clarification they in at least some embodiments, may perform a similar function or have an equivalent structure (e.g., gear housing 22 and 22a). In addition to the disclosed shapes and sizes (e.g., cylindrical, tubular, conical, tapered, etc.), all the aforementioned components, can vary to include numerous adaptations. Further, the material composition of all components can also include numerous elements, such as steel, aluminum, alloys, plastics, etc. Although various components are shown and described in pairs, it is to be understood that a plurality of such components can be utilized to perform the same or similar function as disclosed herein, and the use of the term "plurality" in the description or claims shall be understood to include "one or more."

While the present invention is particularly useful in automotive headlamp assemblies, other applications are possible and references to use in a headlamp assembly should not be deemed to limit the application of the present invention. Rather, the present invention may be advantageously adapted for use where similar performance capabilities and characteristics are desired, and that such modifications may be made by one of skill in the art of the invention without departing from the spirit or intent of the invention and therefore, the invention is to be taken as including all reasonable equivalents to the subject matter.

What is claimed is:

1. An adjuster extender comprising:
 a tubular sleeve longitudinally connected to an extender stud, the sleeve having an inner bore for matingly receiving an adjustment shaft of an adjuster to provide radial support therebetween; and
 a plurality of engagement arms that extend from the sleeve into the inner bore, the engagement arms including arm ends for engaging an adjuster stud on the adjustment shaft to provide an axial interlock between the sleeve and the adjustment shaft.

2. The adjuster extender of claim 1, wherein the extender stud is securable to a headlamp assembly of a vehicle to provide at least partially axial movement of the headlamp assembly during translation of the adjustment shaft.

3. The adjuster extender of claim 2, wherein the adjuster extender further comprises an extender shaft extending between the sleeve and the extender stud.

4. The adjuster extender of claim 3, wherein the sleeve matingly receives therein an engagement portion of the extender.

5. The adjuster extender of claim 2, wherein the sleeve is cylindrical.

6. The adjuster extender of claim 1, wherein the sleeve includes a plurality of arm apertures through which the engagement arms extend into the inner bore.

7. The adjuster extender of claim 1, wherein the sleeve is cylindrical and includes two engagement arms situated on opposing sides of the sleeve.

8. The adjuster extender of claim 1, wherein the engagement arms are flexible and deflect in an outward direction from the inner bore when forcibly contacted during insertion of the adjuster stud into the sleeve.

9. The adjuster extender of claim 1, wherein the arm ends engage a rear wall portion of the adjuster stud as the adjuster stud passes thereby.

10. The adjuster extender of claim 1, further comprising an extender shaft extending between the sleeve and the extender stud, wherein the diameter of the extender shaft is less than the diameter of the sleeve.

11. The adjuster extender of claim 1, wherein the sleeve further includes a wall stop situated in the inner bore, positioned to abut a front wall portion of the adjuster stud.

12. The adjuster extender of claim 1, wherein the inner bore of the sleeve further includes a first bore portion and a second bore portion, and wherein the diameter of the second bore portion is less than the diameter of the first bore portion.

13. The adjuster extender of claim 12, wherein the first bore portion matingly receives therein a first shaft engagement portion of the adjustment shaft of the adjuster, and the second bore portion matingly receives a second shaft engagement portion of the adjustment shaft.

14. The adjuster extender of claim 1, wherein the sleeve includes a pair of opposing arm apertures through which a pair of engagement arms extend into the inner bore, and wherein the engagement arms are flexible and deflect in an outward direction from the inner bore when forcibly contacted during insertion of the adjuster stud into the sleeve, and wherein the extender stud is securable to a headlamp assembly of a vehicle to provide at least partially axial movement of the headlamp assembly during translation of the adjustment shaft.

15. An adjuster extender mechanism comprising:
 an adjuster comprising:
  a housing having a neck;
  a drive gear rotatably engaged with an adjustment shaft extending from the neck, the adjustment shaft including an engagement portion and an adjuster stud at a front end; and
 an adjuster extender comprising:
  a tubular sleeve longitudinally connected to an extender stud, the sleeve including an inner bore for matingly receiving therein the engagement portion of the adjustment shaft of the adjuster to provide radial support therebetween; and
  a plurality of engagement arms that extend from the sleeve into the inner bore, the engagement arms including arm ends for engaging a rear wall portion of the adjuster stud after insertion into the inner bore to axially secure the adjuster extender to the adjustment shaft.

16. The adjuster extender mechanism of claim 15, wherein the extender stud is securable to a headlamp assembly of a vehicle to provide at least partially axial movement of the headlamp assembly during translation of the adjustment shaft via rotation of the drive gear.

17. The adjuster extender of mechanism claim 15, wherein the sleeve includes a plurality of arm apertures through which the engagement arms extend therefrom into the inner bore.

18. The adjuster extender mechanism of claim 17, wherein the sleeve is cylindrical and includes two engagement arms situated on opposing sides of the sleeve.

19. An adjuster extender mechanism comprising:
 an adjuster comprising:
  a housing having a neck;
  a drive gear rotatably engaged with an adjustment shaft extending from the neck, the adjustment shaft including an engagement portion and an adjuster stud at a front end; and
  a plurality of arms extending outward from the adjustment shaft; and
 an adjuster extender comprising:
  a tubular sleeve longitudinally connected to an extender stud, the sleeve including an inner bore for matingly receiving therein the engagement portion of the adjustment shaft of the adjuster to provide radial support therebetween; and
  a plurality of arm apertures in the sleeve for receiving the arms at least partially therein to axially couple the adjuster extender to the adjuster.

20. The adjuster extender mechanism of claim 19, further including a retainer bracket, at least one of, secured to or formed integrally with the sleeve, wherein the retainer bracket includes one or more portions configured for securement to a vehicle surface to provide additional radial support for the sleeve.

* * * * *